Nov. 21, 1939.  P. G. WAGNER  2,180,751
MACHINE GUN STARTER AND RECHARGER
Filed Jan. 11, 1938  13 Sheets-Sheet 3
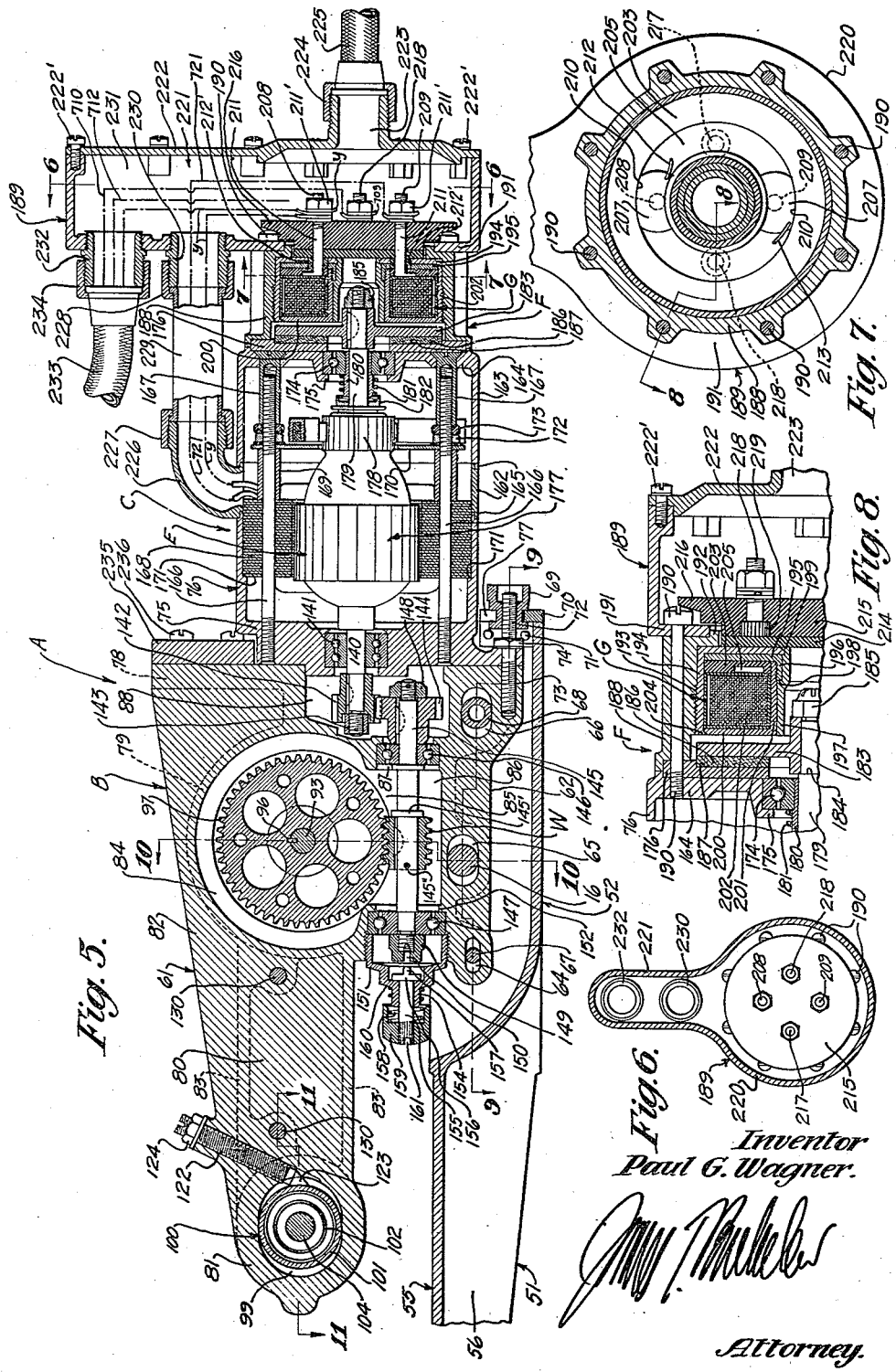
Inventor
Paul G. Wagner.
Attorney.

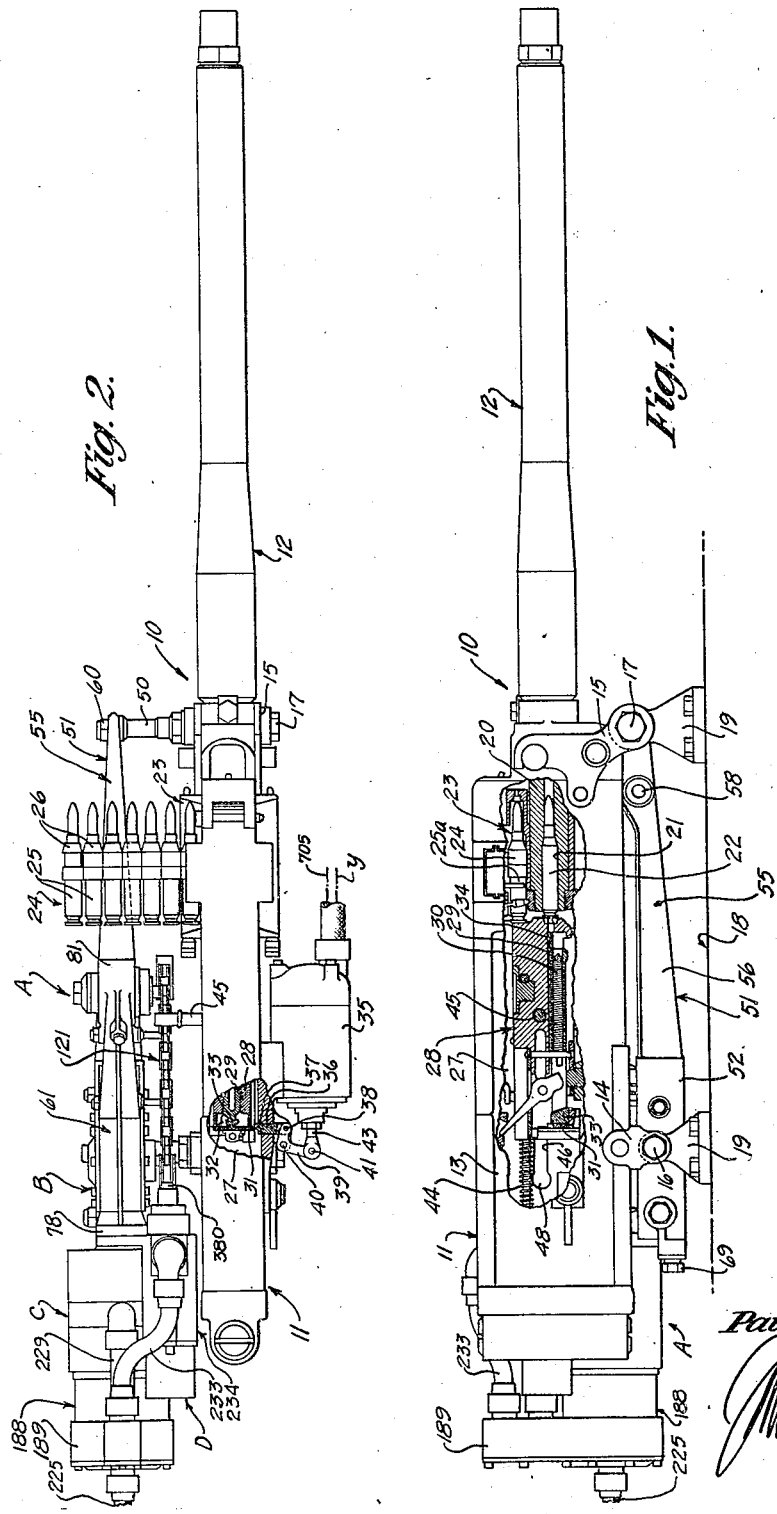

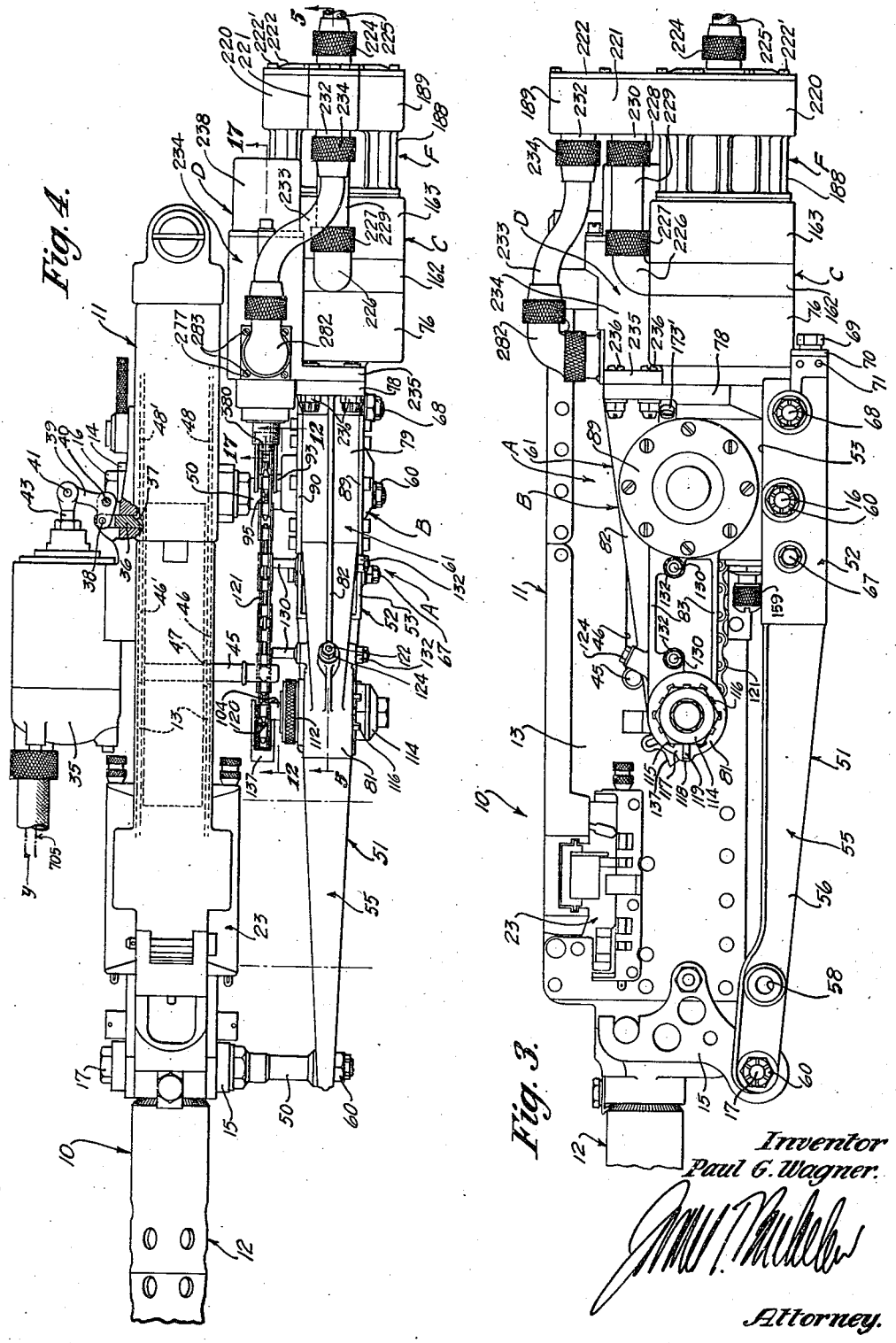

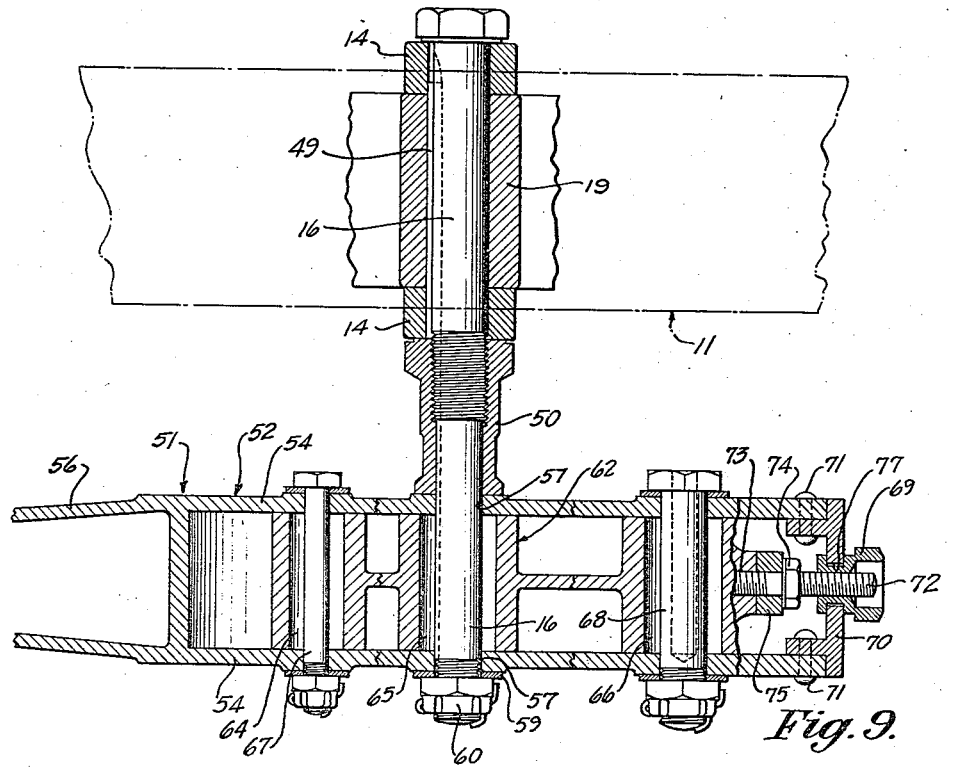
Fig. 9.
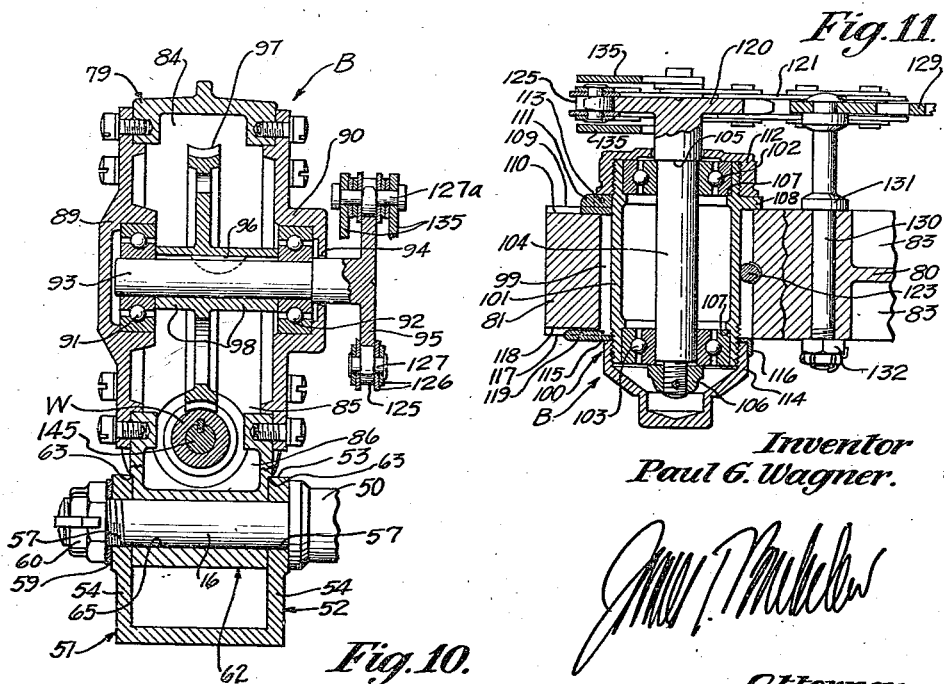
Fig. 10.
Fig. 11.
Inventor
Paul G. Wagner.
Attorney.

Nov. 21, 1939.  P. G. WAGNER  2,180,751
MACHINE GUN STARTER AND RECHARGER
Filed Jan. 11, 1938  13 Sheets-Sheet 5
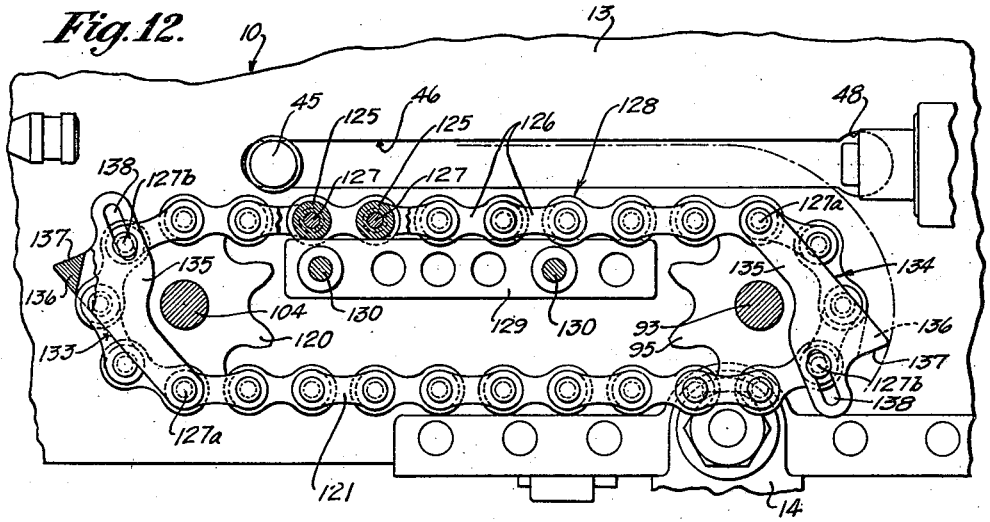
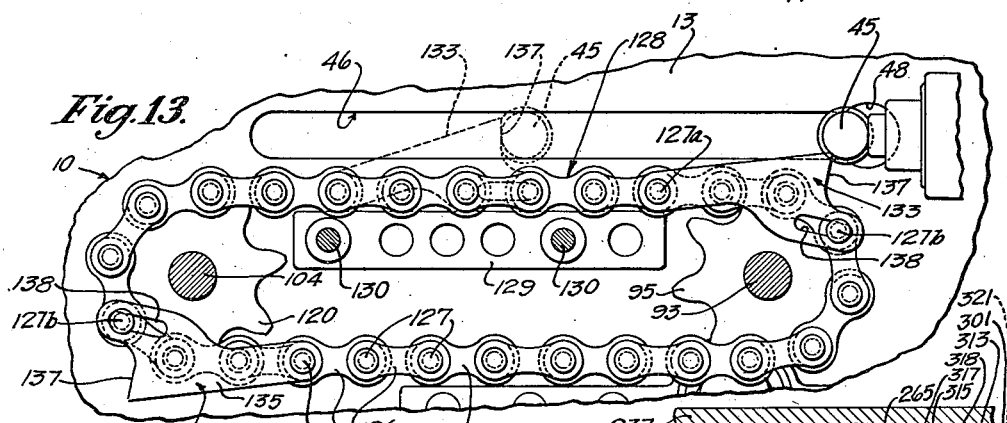
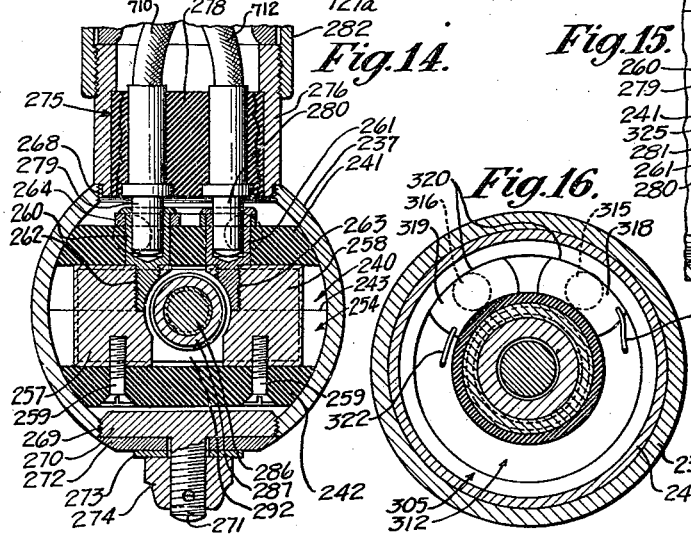
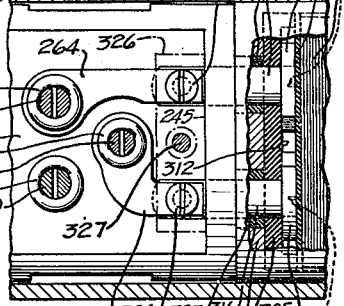
Inventor
Paul G. Wagner.
Attorney.

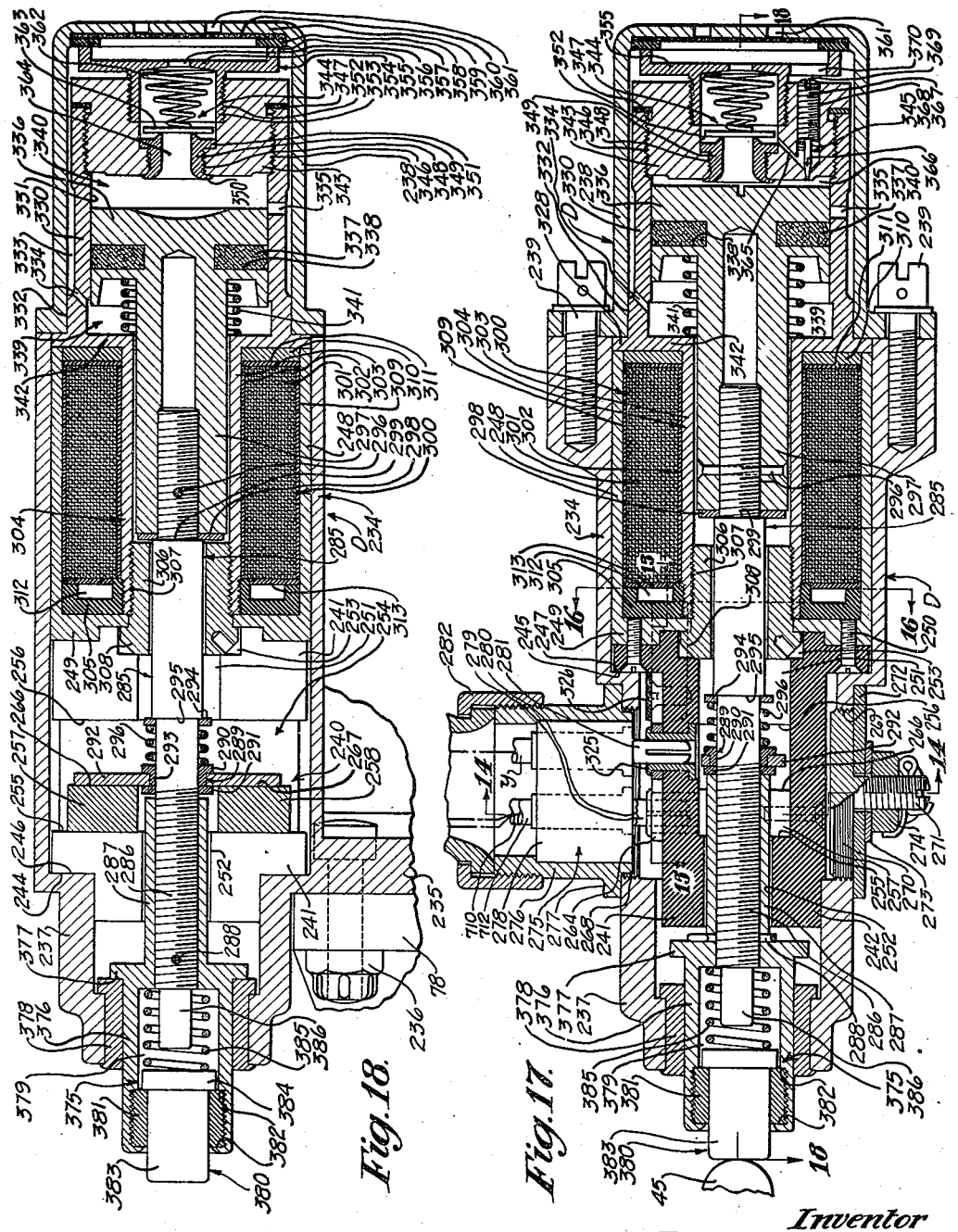

Nov. 21, 1939.　　　P. G. WAGNER　　　2,180,751
MACHINE GUN STARTER AND RECHARGER
Filed Jan. 11, 1938　　　13 Sheets-Sheet 7
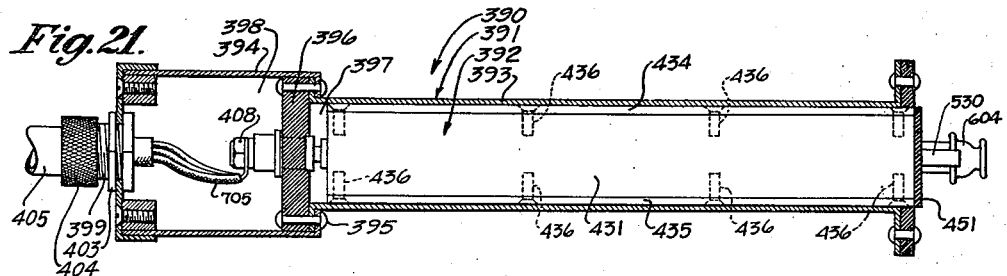
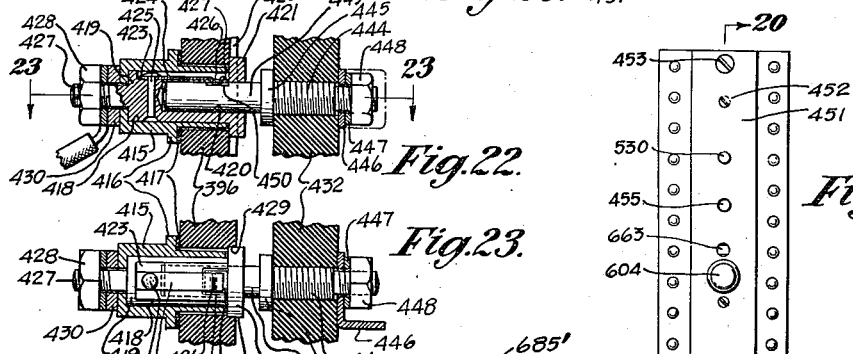
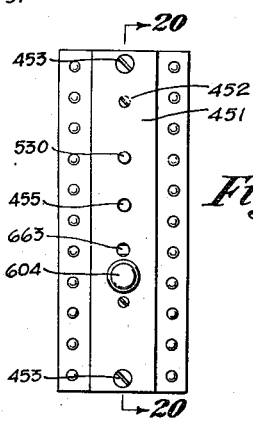
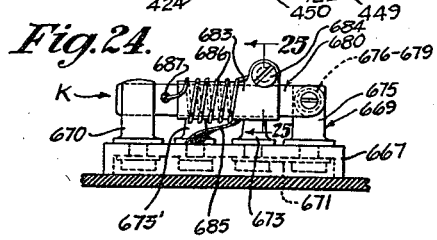
Inventor
Paul G. Wagner.
Attorney.

Nov. 21, 1939.     P. G. WAGNER     2,180,751
MACHINE GUN STARTER AND RECHARGER
Filed Jan. 11, 1938     13 Sheets-Sheet 8
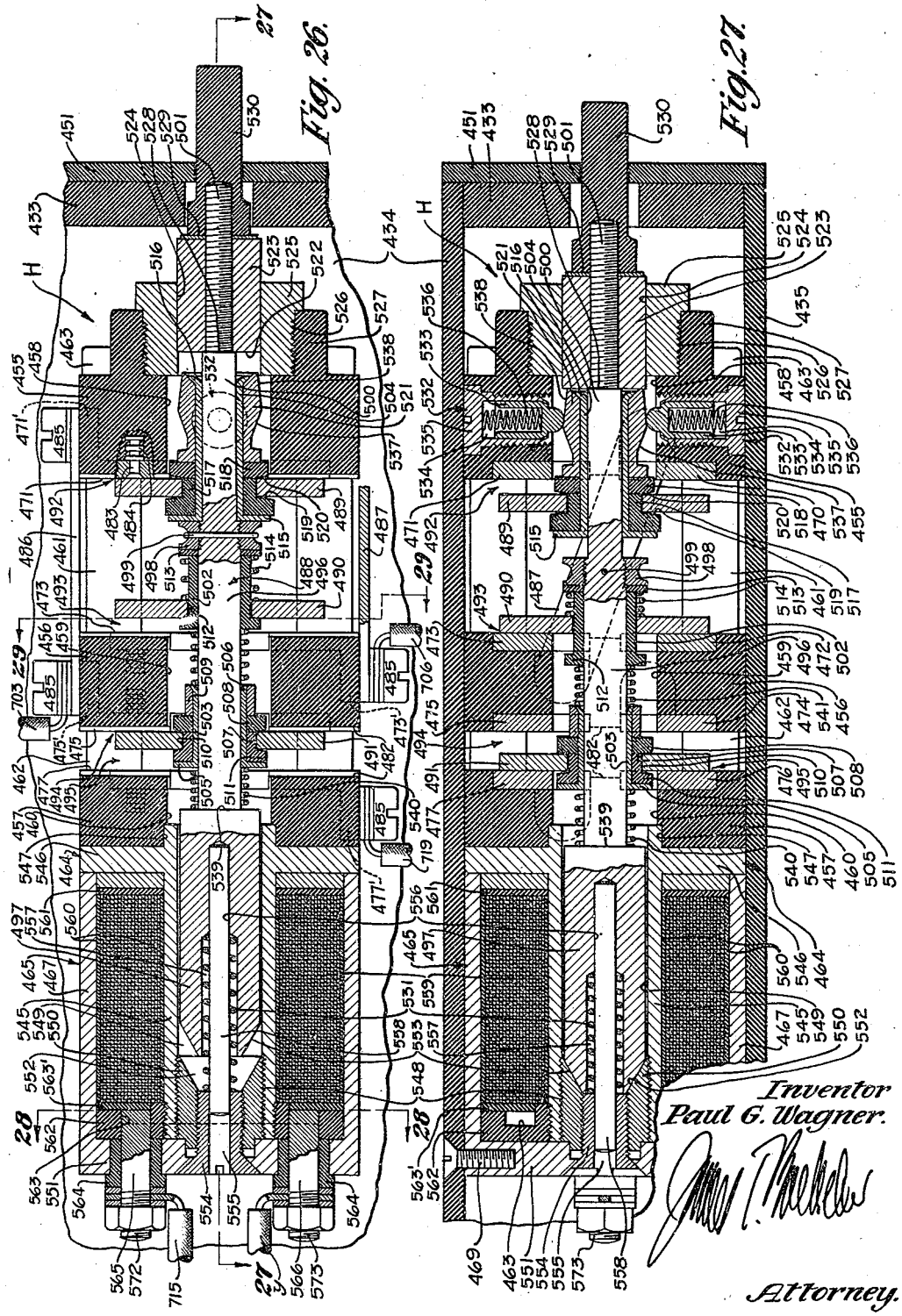
Inventor
Paul G. Wagner.
Attorney.

Nov. 21, 1939.     P. G. WAGNER     2,180,751
MACHINE GUN STARTER AND RECHARGER
Filed Jan. 11, 1938      13 Sheets-Sheet 9
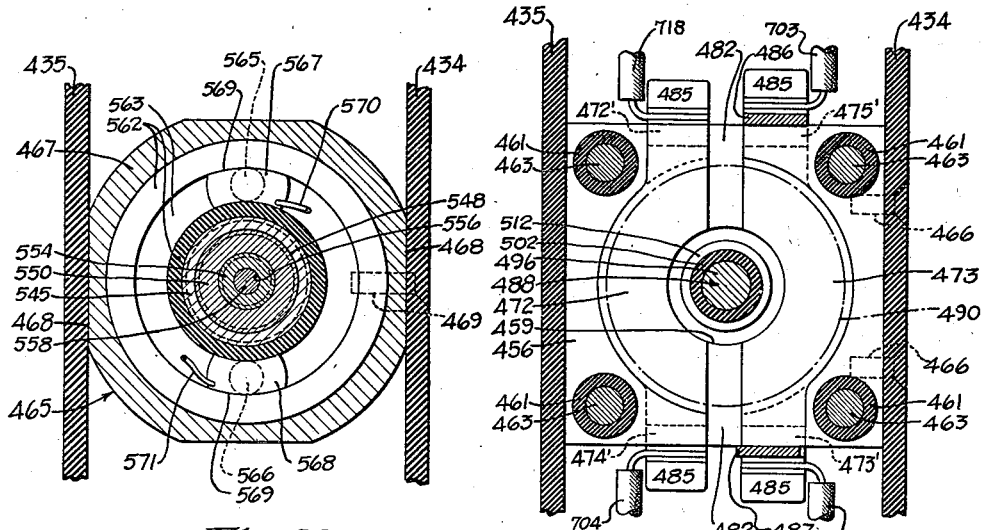
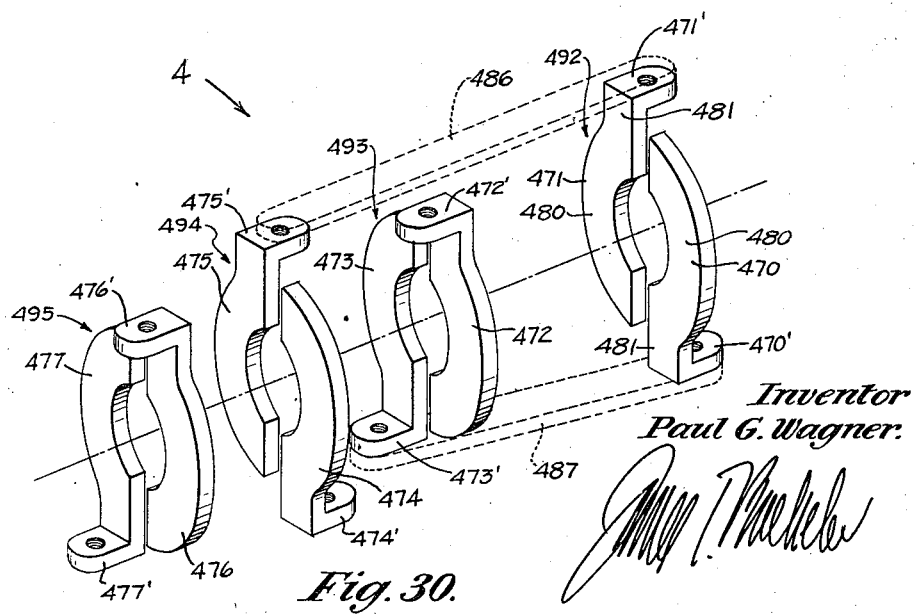
Inventor
Paul G. Wagner.
Attorney.

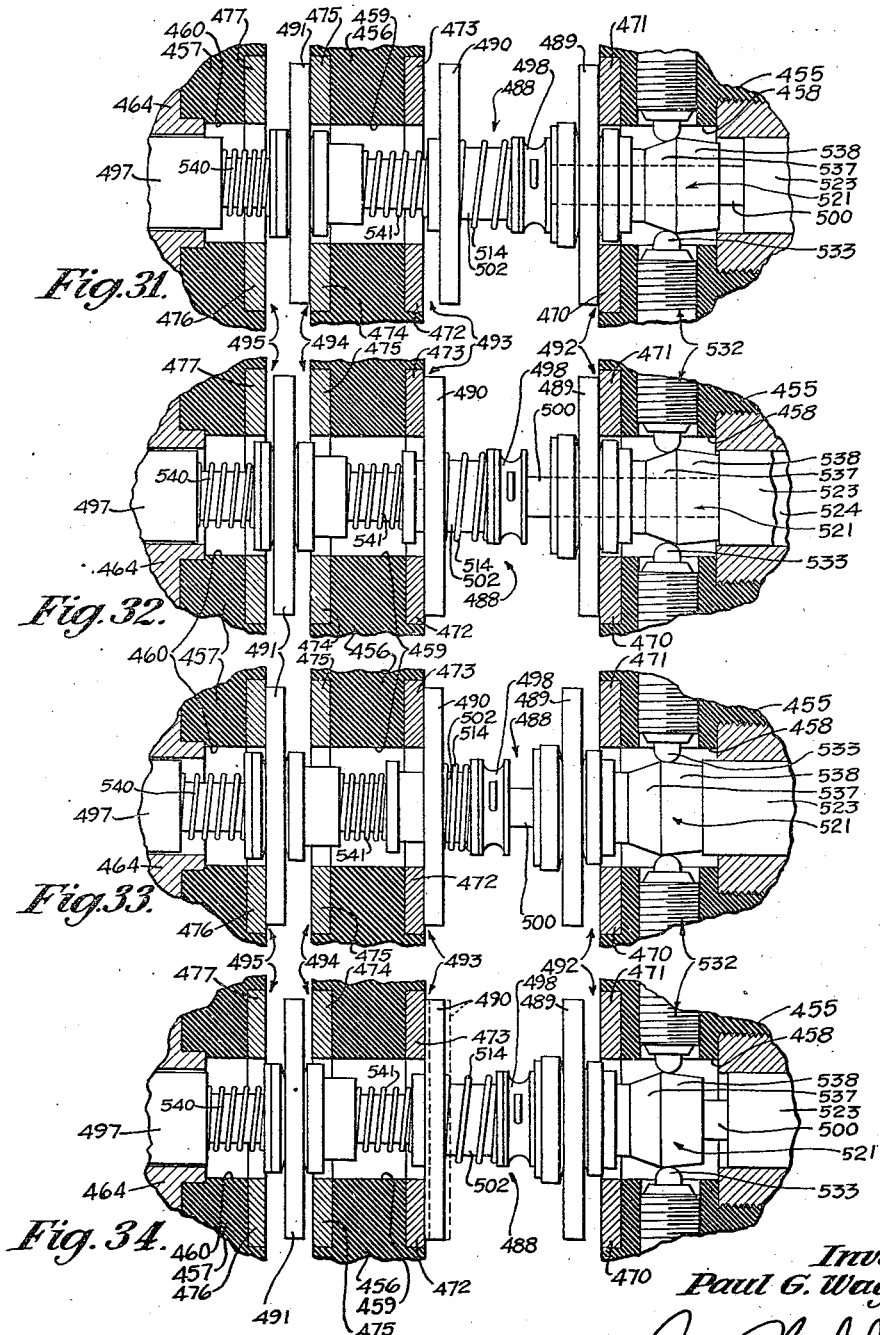

Nov. 21, 1939.    P. G. WAGNER    2,180,751
MACHINE GUN STARTER AND RECHARGER
Filed Jan. 11, 1938    13 Sheets-Sheet 11
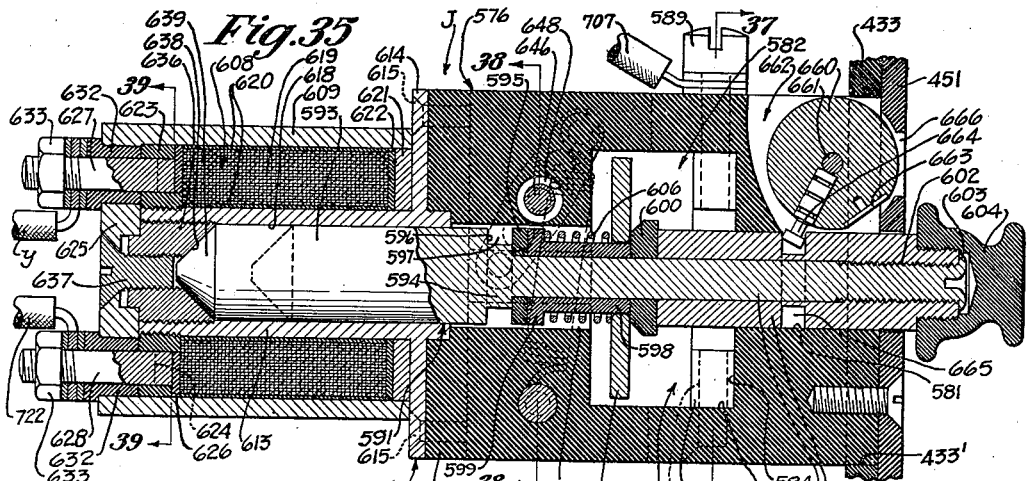
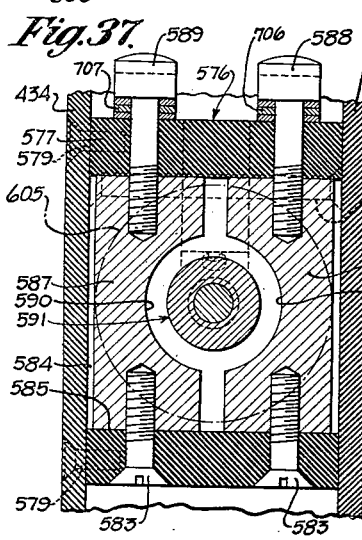
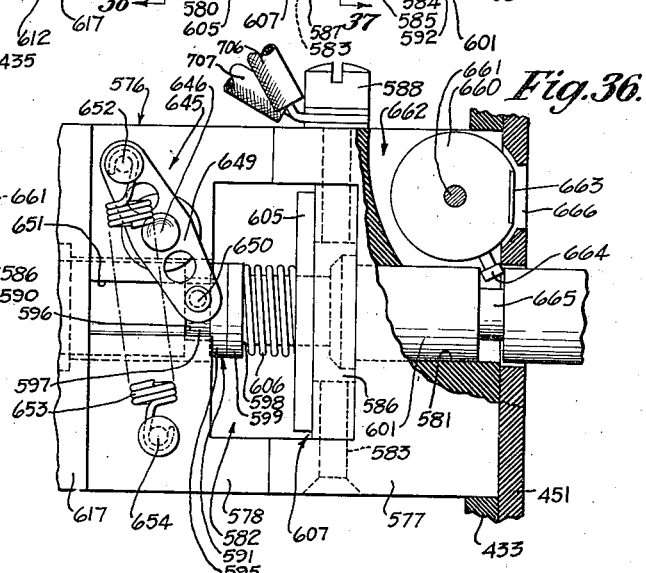
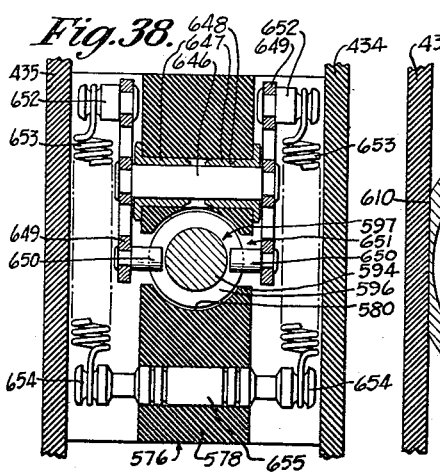
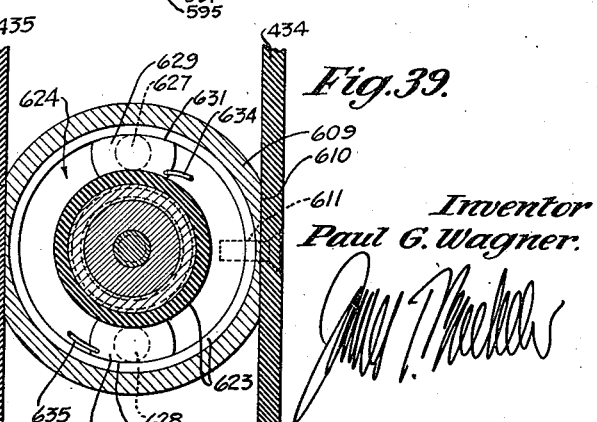
Inventor
Paul G. Wagner.
Attorney.

Nov. 21, 1939.     P. G. WAGNER     2,180,751
MACHINE GUN STARTER AND RECHARGER
Filed Jan. 11, 1938     13 Sheets-Sheet 12

Inventor
Paul G. Wagner
Attorney.

Inventor
Paul G. Wagner.
Attorney.

Patented Nov. 21, 1939

2,180,751

UNITED STATES PATENT OFFICE 2,180,751

MACHINE GUN STARTER AND RECHARGER

Paul G. Wagner, Los Angeles, Calif.

Application January 11, 1938, Serial No. 184,422

43 Claims. (Cl. 89—1)

This invention has to do generally with mechanisms and systems for starting and recharging machine guns and is more particularly concerned with electrically operated starters and rechargers. The device may be applied with advantage to machine guns of any type which may be adapted to take the mechanism, and irrespective of the type of gun-emplacement. However, it is particularly well adapted for use in connection with air-craft machine guns and even more particularly with those of the fixed or wing type. Therefore, I will describe the device as applied to wing-type guns and will speak of the solutions which the device offers to the peculiar problems offered by such guns, but it is to be understood that this illustrative choice is in no way to be considered as limiting the invention.

Also I will describe a system wherein the starters of several guns or banks of guns are put under the control of a single trigger-switch, but again this is not to be taken as limitative since parts of the system are fully effective even though applied to a single gun.

I will also describe the device in connection with a gun of a particular make, namely, the Browning, and will describe briefly the structure of such a gun in order operatively to associate the parts of my device with the parts of a known mechanism, but this is done for purposes of illustration only, and is not to be considered as limitative on my invention, considered in its broader aspects.

Generally, guns of this type are recoil-actuated, that is, the force of recoil is used to perform various mechanical operations of the gun. When the gun is fired, the recoil unlocks the breech and throws back the bolt, added rearward impetus usually being given by the action of an accelerator, and this retractive movement of the bolt or bolt group (which contains all the firing mechanism) extracts a live cartridge from the ammunition belt, extracts the case of the expended cartridge from the chamber, cocks the firing mechanism and retracts the ammunition-belt-feed pawl.

On counter-recoil or subsequent forward movement of the bolt under the action of the driving spring, the bolt ejects the empty cartridge case, feeds the selected live cartridge into the chamber, feeds the belt links and cartridges forwardly one step, closes and locks the breech and releases the safety device of the firing mechanism. Then, if the trigger is still held depressed, the gun is immediately re-fired and the above cycle is repeated until the trigger is released. Upon trigger-release, any cycle which may have been started is completed, thus leaving a live cartridge in the chamber ready for subsequent firing.

If a defective shell or "dud" is entered in the chamber, its consequent failure to fire robs the gun of recoil actuation. There is thus no available force to extract the defective shell and replace it with a live one—this all meaning that the gun goes dead. Likewise it will be seen that when a new ammunition belt is fed to the gun, there will be no live cartridge in the chamber, the recoil from the last cartridge fired from the previous belt having been effective only to extract and eject the last cartridge case. Thus, if a plane takes off without having introduced a live cartridge into the chamber (even though a full belt has been started in the feed-way) there is no force available to introduce a live cartridge into the chamber—and the gun remains dead.

To overcome these problems, it has been the custom to provide the bolt or bolt assembly with a stud which projects from one side of the gun and to apply to this stud an "operating slide" which is in the nature of a rod adapted to be hooked over the stud. The gunner, by pulling back on this hooked rod and against the force of the driving spring and then releasing it, performs the same office as that normally performed by the force of recoil. If reloading because of an empty belt, his action cocks the gun and puts a live cartridge in the chamber—if the stoppage is because of a defective shell, his action extracts and causes subsequent ejection of the dud and the loading of the chamber with a live shell so that firing may be continued.

This manual actuation is not only difficult because of the force required to overcome the strength of the driving spring, but it necessarily takes appreciable time and, in any event, distracts the gunner's attention from his duties which sometimes include both piloting and gunning. And the loss of that time or that distraction may spell the difference between life and death to the gunner and gun crew. Furthermore, the gun emplacement may be such that the manual charger is relatively inaccessible. This condition is particularly aggravated in wing-type guns, and the attempted solution by carrying cables back from the charging hook or "operating slide" to the cockpit and into reach of the pilot-gunner, is far from satisfactory for obvious reasons.

Therefore it is among the general objects of my invention to provide means whereby the starting or recharging may be accomplished with ease and speed. As a very particular feature, the system is such that, should a stoppage occur, the recharger comes into action instantaneously and automatically, and, by actual test, the action is so rapid that from the time a defective cartridge has failed to fire up to the time that it has been replaced by a live cartridge and that cartridge has been fired, only one and one quarter seconds have elapsed.

If the successive cartridges are defective, the device automatically continues in operation (assuming the trigger is held closed) until a live cartridge reaches the chamber and puts the gun back into action although, as a precaution, I prefer to provide automatically operating means for throwing the recharger out of operation in the event it operates continuously for a given number of cycles, though the throw-out does not act if the successive cycles are not continuous. The throw-out is thus adapted to function in the event the ammunition belt is emptied, for with no fresh cartridges available for feeding into the chamber, the charger will cycle continuously as long as the trigger is depressed and thus have the same effect as though defective cartridges were repeatedly presented to the chamber. Likewise, if the gun jams or the charger mechanism stalls, the charger circuit is opened by automatic action of the breaker.

While the gun is idle there is no drain on the source of electrical supply which operates the charger, but the instant the gun is put into action by depressing the firing trigger, the charger is automatically put in readiness to perform its function, drawing but little current while in this readiness stage. Current is used to an appreciable extent only when the charge is actually in operation.

Now it is sometimes of advantage, and, in wing-type guns, it is essential that the firing mechanism be capble of remote control. This control is usually by way of a motor or solenoid attached to the gun and adapted, when energized, to actuate the sear of the firing mechanism in a manner to release the firing pin. The solenoid is in a firing circuit controlled by a cockpit trigger. In the act of pulling the trigger to close the firing circuit and thus fire the gun, the recharger circuit is likewise closed and thus put in a condition of readiness for instant action should there be a stoppage. As a particular feature, I have arranged an automatically acting switch which opens the firing circuit in the event the recharger starts into reloading operation, thus reducing the drain on the battery feeding the various circuits. Since it is impossible to fire the gun until the reloading operation is completed, this opening of the firing circuit does no harm, and it is reclosed an instant before the live shell is chambered, so no useful firing time is lost due to the interruption of the firing circuit.

The circuiting arrangement is also such that once a recharging cycle is started, it will continue to completion even though the gunner releases the trigger before such completion. Where several guns are in circuit, each with its individual recharger, the circuiting is such that the operation of one recharger will not affect the other rechargers.

Of course, in certain cases the trigger may mechanically and directly control the firing mechanism. In such a case there will be no firing-circuit complications, and the trigger in its movement releasing the firing pin may be utilized to act on a switch adapted to close the "readiness" or "priming" circuit of the charger, which circuit, as well as the main charger circuit will remain closed as long as the trigger is depressed or, if the trigger be released during a charging cycle, will remain closed until the cycle is complete even though the trigger be released in the meantime.

It is also among the objects of my invention to provide a device of the character described which may be applied to a machine gun without altering the standard gun-mechanism. Likewise, since guns of the type mentioned are, for a well understood reason, reversible to take their cartridge-feed from either the left or right hand sides, my device is so constructed that it may be easily and quickly adapted to fit a gun irrespective of the side of feed.

The device is also constructed so that it is exceedingly compact and of such shape and size that it occupies the least possible space (a feature of great importance when it is considered that often the gun and recharger occupy exceedingly cramped quarters between upper and lower wing surfaces and the other clearances are seriously impaired) and in no way interferes with the normal functioning of the gun. Yet the actual mechanism of the recharger is such that its interior parts are rendered easily accessible for inspection or repair.

As is so essential to any aircraft device, the recharger is extremely light and yet sufficiently sturdy to withstand vibration strains and other severe service conditions to which it is exposed.

Other objects and features of novelty will become apparent from the following detailed description, reference being had to the accompanying drawings, in which:

Fig. 1 is a side elevation of a gun equipped with my charger showing certain of the gun-elements in broken-away section and in more-or-less diagrammatic form;

Fig. 2 is a top plan view of Fig. 1, showing also a cartridge-belt in place;

Fig. 3 is a side elevation showing an enlarged view of the charger and only the immediately adjacent part of the gun, as viewed from the side opposite that shown in Fig. 1;

Fig. 4 is a plan view of Fig. 3 but showing in broken-away section and somewhat conventionally certain elements of the firing mechanisms;

Fig. 5 is an enlarged section on line 5—5 of Fig. 4;

Fig. 6 is a reduced section on line 6—6 of Fig. 5, but omitting the wires leading to the binding posts;

Fig. 7 is an enlarged section on line 7—7 of Fig. 5;

Fig. 8 is a section showing a fragmentary enlargement of the motor brake as viewed from the planes indicated by broken line 8—8 of Fig. 7;

Fig. 9 is an enlarged fragmentary section on line 9—9 of Fig. 5;

Fig. 10 is an enlarged section on line 10—10 of Fig. 5;

Fig. 11 is an enlarged section on line 11—11 of Fig. 5;

Fig. 12 is an enlarged section on line 12—12 of Fig. 4;

Fig. 13 is a view similar to Fig. 12 but showing the parts in changed positions;

Fig. 14 is a section on line 14—14 of Fig. 17;

Fig. 15 is a section on line 15—15 of Fig. 17, with the casing broken away to its horizontal axial plane;

Fig. 16 is a section on line 16—16 of Fig. 17;

Fig. 17 is an enlarged section on line 17—17 of Fig. 4;

Fig. 18 is a section on line 18—18 of Fig. 17 but showing the parts in different positions;

Fig. 19 is a front elevation of the control box;

Fig. 20 is an enlarged section on line 20—20 of Fig. 19, the wires between elements being omitted to avoid confusion, said wiring being indicated in the general wiring diagram of Fig. 40;

Fig. 21 is a section on line 21—21 of Fig. 20;

Fig. 22 is an enlarged fragmentary section taken through a typical connection between the two sections of the control box;

Fig. 23 is a section on line 23—23 of Fig. 22;

Fig. 24 is an enlarged section on line 24—24 of Fig. 20;

Fig. 25 is an enlarged section on line 25—25 of Fig. 24;

Fig. 26 is an enlarged medial section through the control switch;

Fig. 27 is a section on line 27—27 of Fig. 26 but showing the parts in changed positions;

Fig. 28 is a section on line 28—28 of Fig. 26;

Fig. 29 is a section on line 29—29 of Fig. 26;

Fig. 30 is a detached, schematic perspective of certain of the contact members in the control switch of Fig. 26;

Figure 40:
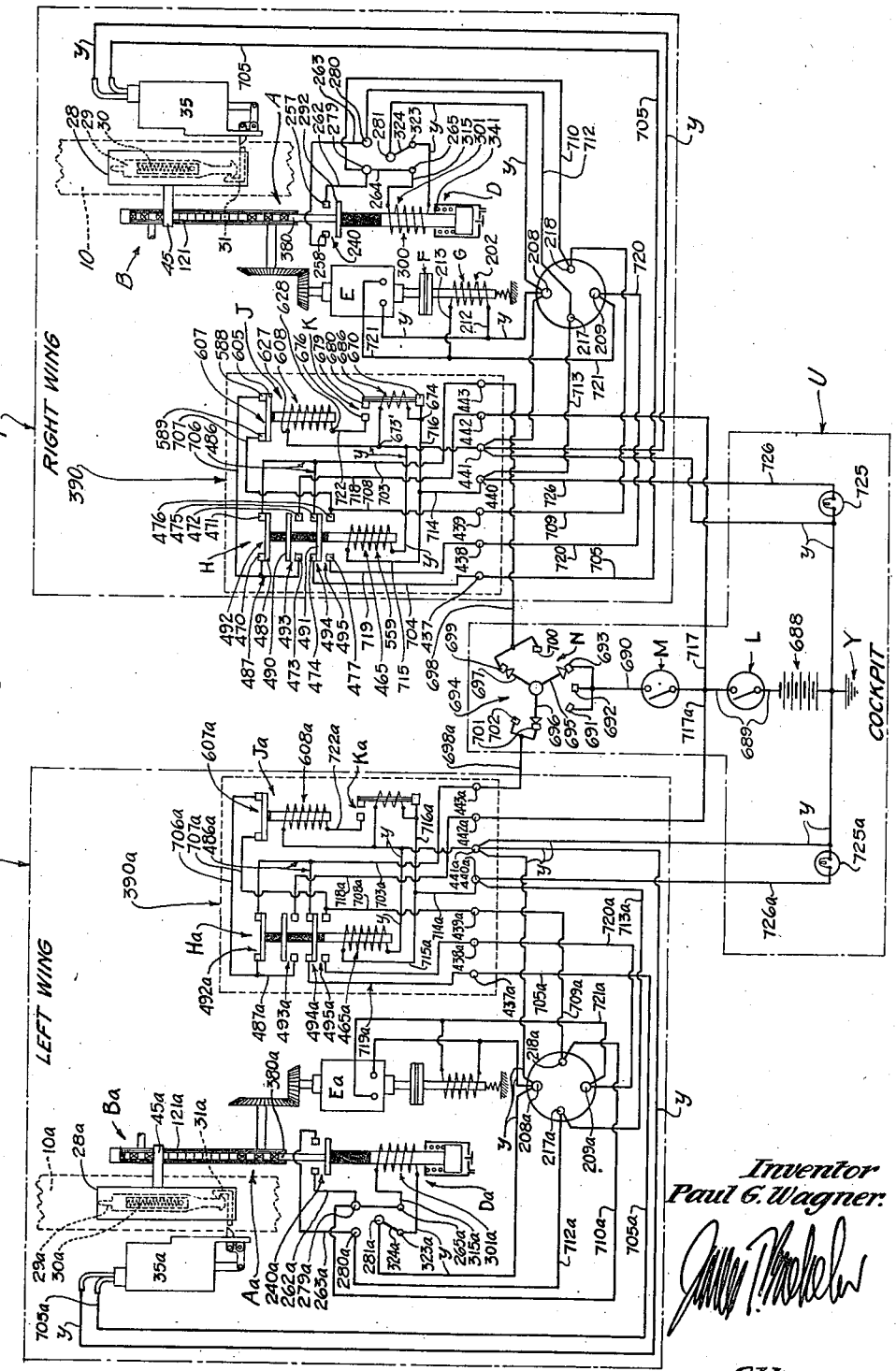
Figure 41:
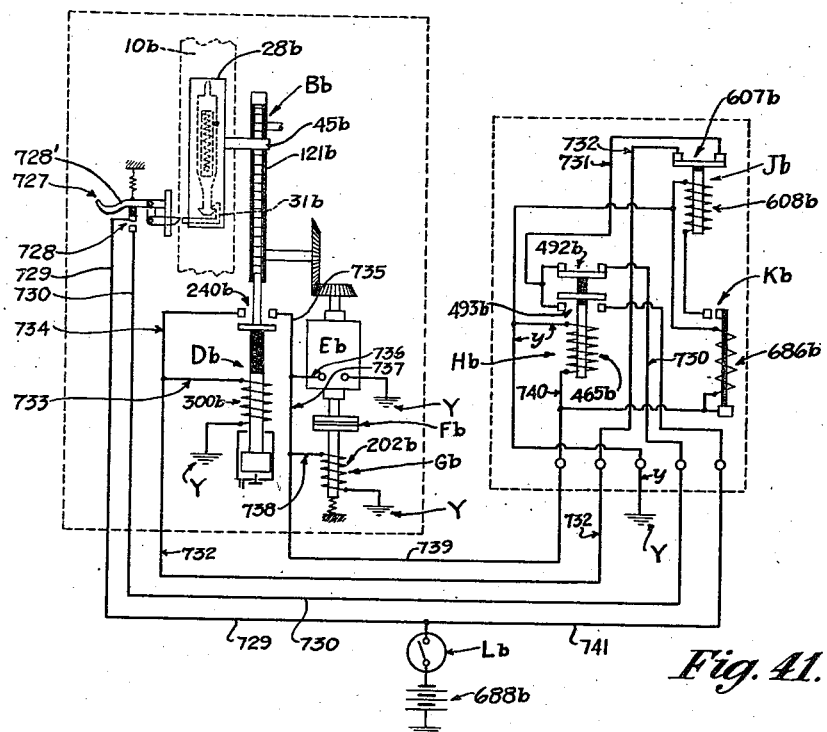

Figs. 31 to 34, inclusive, are fragmentary sections, partly in elevation, showing successive positions of certain elements in the control switch of Fig. 26;

Fig. 35 is an enlarged medial section through the circuit breaker shown in the control box of Fig. 20, but showing the breaker open;

Fig. 36 is a fragmentary elevation of the part of the mechanism shown in Fig. 35, but showing parts thereof in broken-away section, the breaker here being shown as closed;

Fig. 37 is a section on line 37—37 of Fig. 35;

Fig. 38 is a section on line 38—38 of Fig. 35 but showing the breaker parts in a position intermediate full-open and full-closed positions;

Fig. 39 is a section on line 39—39 of Fig. 35;

Fig. 40 is a wiring diagram of a two-gun control;

Fig. 41 is a wiring diagram of a variational embodiment; and

Figure 42:
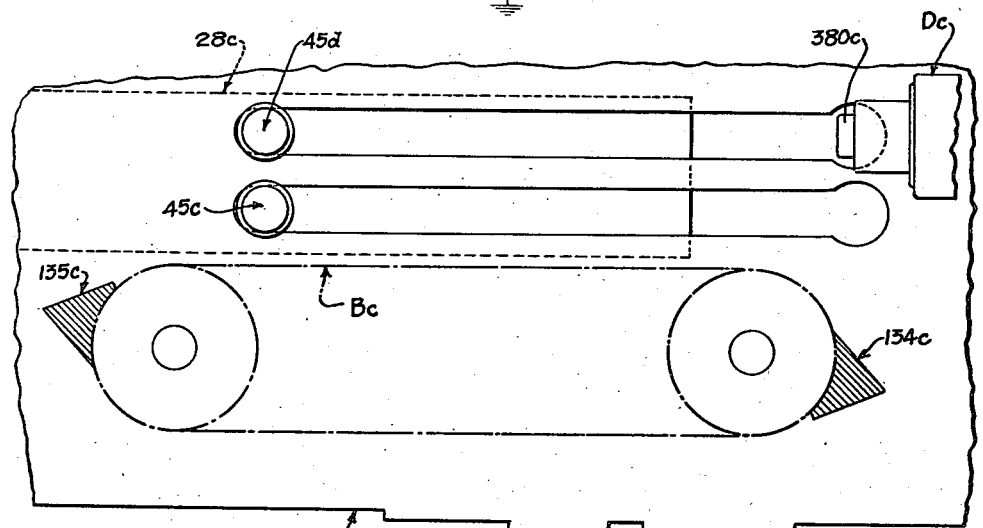

Fig. 42 is a schematic view showing a variation in the arrangement of the priming switch tappet.

As stated above, I have illustrated a machine gun of a known type and make, this being done for illustrative purposes only and is not to be considered as limitative on the invention. Thus, reference numeral 10 indicates generally a reversible-feed, fixed or wing type of Browning aircraft machine gun. The mechanism and operation of such guns is well understood to those skilled in the art, but reference to the following patents may advantageously be had:

1,293,021, Browning, February 4, 1919; 1,803,349, Pfeiffer, 1,803,350, Tansley 1,803,351, Moore, 1,803,352, Tansley, all of May 5, 1931; and 1,936,254, Moore, November 21, 1933.

I will describe only such parts of the gun, proper, as may be of interest in following through a typical firing cycle in order better to understand the various functions of my recharger, and in order more definitely to relate certain parts of the recharger to parts of the gun. The showing of the gun elements is somewhat schematic and conventional, but will suffice for this limited purpose.

Gun 10 is made up generally of receiver 11 and jacketed barrel-assembly 12. Attached to the side or cheek plates 13 of receiver 11 are rearward adapters 14 and forward adapters 15 which take cross-bolts 16 and 17, respectively, whereby the gun is removably secured to a stationary base 18 (for instance, a fixed part of the wing structure of an aircraft) through brackets 19.

Barrel 20 is chambered as at 21 to receive a cartridge 22, while cheek plates 13 are cut away to provide a feedway 23 adapted to receive an ammunition belt 24 made up in the usual manner of live cartridge 25 and belt-links 26. In Fig. 1, one of the live cartridges 25a is shown within the receiver and in position to be withdrawn from the belt upon the next firing of the gun.

Adapted to reciprocate longitudinally within the receiver-hollow 27 is bolt 28 which is adapted to carry the various elements of the firing mechanism in the usual manner. Among these elements is the firing pin 29 which is adapted to be projected into firing position by firing-pin spring 30. In Figs. 1 and 2 this firing-pin is shown in cocked position, a usual sear 31 being indicated conventionally in Fig. 2. This sear has a usual hook 32 engaged with the firing-pin head 33, thus releasably holding the firing-pin from being projected to firing position. The sear is shifted upwardly (as viewed in Fig. 2, though with the gun in normal position this shift is horizontal) to clear hook 32 from head 33 in order to release the firing-pin for projection into firing position, that is, to cause striker 34 to forcibly engage the priming cap of cartridge 22.

While this sear may be shifted to release position in a variety of manners and in accordance with the particular type of trigger employed, I have chosen to illustrate the use of a well known type of trigger solenoid generally indicated at 35. In this case, sear 31 is shifted to release position by inward projection of a plunger 36 having a beveled nose 37 in line with sear 31. At 38 the plunger is pivotally connected to crank 39 supported at 40 on the gun-case, said crank being pivotally connected at 41 to core or plunger 43 of solenoid 35. Upon the firing of the gun, bolt 28 is freed for its recoil movement, but if plunger 36 is continuously held in its innermost position it will act on the sear to release the firing pin each time the bolt returns to its full-forward position.

Crank 39 is rotated in a counter-clockwise direction (as viewed in Fig. 4) to release the firing-pin, by energization of solenoid 35 and the consequent draft exerted on core 43. The energization of the solenoid is accomplished by closing a firing circuit through manual pressure exerted on a trigger, all of which will be described later.

Assuming now that the gun is fired by shifting the sear to release position, the recoil force is effective to unlock the breech and to project bolt 28 rearwardly. This rearward movement extracts the now empty case of cartridge 22 from chamber 21, extracts cartridge 25a from belt 24, cocks the firing mechanism and retracts the ammunition belt feed pawl (not shown). On counter-recoil movement of the bolt due to the action of driving spring 44, bolt 28 feeds live cartridge 25a into chamber 21, feeds belt 24 one step forward (feeding means not here shown) closes and locks the breach (means not here shown) and releases the safety device (not shown) of the firing mechanism; thus returning the mechanism to the condition of Figs. 1 and 4 so that if the trigger is still depressed, the firing and reloading cycle described above will be instantly repeated—and these cycles will continue until the trigger is released. Thereupon, the sear will again become effective to hold the firing-pin in retracted position so the chambered cartridge will not be fired, but the entire mechanism is ready for a repetition of the firing and reloading cycle upon subsequent pressure on the trigger, for the last cycle will have left a live cartridge in the chamber.

Should a defective shell find its way into the chamber or if the chamber is empty by reason of the emptying of the ammunition belt (even though the new belt has been introduced to the feed-way but has not delivered a live cartridge to the chamber) there will be no recoil force available to throw a fresh load into the chamber. It is therefore usual to provide a bolt or cocking stud 45 which extends from bolt 28 and through slot 46 (Fig. 12) in one of the side plates 13, into the projected position illustrated in Fig. 4. This stud is threaded into bolt 28 and held from subsequent outward displacement by stud collar 47 which is opposed by the inner face of plate 13. At the rearward end of slot 46 is an enlarged opening 48 which will permit the outward passage of collar 47 when the stud is to be detached from one side of bolt 28 and reapplied to the other side thereof when the gun-feed is reversed side for side, it being understood that a slot and opening 46' and 48', respectively, are provided on the opposite side plate of the receiver in order to allow for such stud-reversal.

Previously, when a gun was to be loaded or reloaded under any of the above conditions, it has been usual to apply a hook or slide assembly (not shown) whereby the stud might be manually retracted against the force of driving spring 44, this retraction extracting the dead cartridge, if any, from the chamber, extracting a live cartridge form the belt, and cocking the firing mechanism. Then, when the stud was released for forward movement, driving spring projected the bolt in a manner to eject the dead cartridge and to chamber the live cartridge, whereupon the gun was again in condition to fire upon depression of the trigger.

My charger, generally indicated at A, is mounted on the side of the gun and is adapted to act against stud 45 for retracting bolt 28 under any of the conditions stated above, coming into play automatically in the event of a stoppage when the trigger is depressed, thus relieving the gunner of the necessity of undertaking the task which, as was pointed out in the forepart of the specification, represents a very series interruption. Likewise, as will be later pointed out, the recharger may be put into actuation by a wilful act on the part of the gunner or pilot, but this act is nothing more than the closing of a switch or the pulling of the trigger, and therefore does not present difficulty of any kind.

Of course, broadly speaking, in order to retract the bolt, the charger can be adapted to engage any suitable element or portion of bolt 28 whether or not that element be a part of the standard gun equipment, though, since the coking or bolt stud is provided as standard equipment, its uniform availability makes it the most logical engagement-element, particularly since its use eliminates need of altering or adding to the standard gun parts. However, the cocking or bolt stud, being, in effect, a part of the bolt, it may be considered that the charger is adapted to engage the bolt itself, and my broader claims contemplate such general application.

For the same reasons of availability of standard parts, I utilize the bolt stud as a tappet for actuating the "priming" or "readiness" switch which plays a part in the control of the recharger motor, as will later be described. However, it will be realized that while the adaptability of the recharger system to this use of the bolt stud for performing two functions (bolt retraction and switch actuation) is a novel and valuable provision, it lies within the scope of my invention to utilize a separate bolt-carrying element for operating the said switch and, in a variational form which I will later describe, such provision is made.

In the immediately following description of the mechanics of the starter or recharger and the various switches used in connection therewith I will not specify the particularities of the electrical circuiting, as that would be meaningless until all the mechanical structures are understood. Therefore, in preliminarily describing the make-up, functions and operations of certain of the parts, I will merely identify circuit terminals or contacts and state what will happen when circuits leading to or from them are opened or closed. Subsequently the circuits themselves will be established.

In order to prepare gun 10 for the application of charger A, it is merely necessary to replace the usual mounting bolts with elongated bolts 16 and 17, bolt 16 being keyed to adapters 14 at 49 and the usual stud nuts being replaced by sleeve-nuts 50.

Elongated adapter frame or carriage 51 is made up of upwardly opening channel or box-portion 52, the upper edges 53 of channel legs 54 (Figs. 9 and 10) preferably being planed smooth, and of extension 55 which is preferably ribbed at 56. Legs 54 are apertured at 57 to take bolt 16, while extension 55 takes bolt 17, a second bolt hole 58 being provided to take the mounting of a gun wherein the standard dimensions differ from those of the model illustrated.

Carriage 51 is detachably held against displacement from bolts 16 and 17 by washer 59 and pinned nuts 60.

The charger, proper, which is bodily but adjustably fixed to carriage 51, is made up of three general units—retracter unit B, drive-motor unit C and priming switch unit D, the motor carried by unit C being indicated generally at E (Fig. 5); all three units being interconnected so they may be moved as one with respect to carriage 51. I will first describe retracter unit B.

Body member 61, preferably in the form of a casting, has a downward extension or foot-piece 62 which fits between channel legs 54, the downwardly facing and outwardly extending shoulders 63 (Fig. 10) near the upper end of the foot-piece being adapted to rest and, at times, to slide limitedly on the tracks presented by the upper edges 53 of the channel legs.

Extending through foot-piece 62 are horizontally elongated holes 64, 65 and 66 adapted to take bolts 67, 16 and 68, respectively. Bolts 67 and 68 likewise extend through channel legs 54, and it will be seen that by loosening these bolts, as well as nut 60 on bolt 16, the retracter unit B may be bodily shifted longitudinally of carriage 51 to accomplish certain adjustments, the purpose of which will be later made clear. It will also later appear that since units B, C and D are tied together, the bodily shifting of B likewise shifts units C and D and all elements carried thereby.

It is desirable that there be a capability of very fine adjustment of these units and certain of their elements with respect to certain gun parts, and therefore I have provided an adjustment nut 69 which is mounted for rotation in but held against relative longitudinal movement by an end-piece 70 which is secured at 71 (Fig. 9) to the rearward ends of legs 54. This adjustment nut takes bolt or lead screw 72, which is threaded into foot-piece 62 at 73, nut 74 being applied to end-wall 75 of motor casing 76, through which end-wall the bolt 73 also passes, serving to tie together that wall and body member 61. It will be obvious that, with the nuts on bolts 16, 67 and 68 loosened, manipulation of nut 69 will feed units B, C and D longitudinally with respect to the gun to accomplish the adjustments of which I will speak later. End piece 70 has an upwardly opening slot 77 which permits upward movement of adjustment nut 69 so, when bolts 16, 67 and 68 are removed, the entire charger may be lifted clear of carriage 51.

Body member 61 has a rearward, vertically extending attachment flange 78, a circular, hollow hub portion 79, and a forwardly extending arm 80 terminating in a horizontally elongated hollow hub 81, the body-member casting having vertical ribs 82 and horizontal ribs 83. Hollow 84 of hub 79 opens downwardly at 85 to hollow 86 which is provided just above foot-piece 62, and this hollow, in turn, opens through bore 87 into hollow 88 which opens to the rearward face of body member 61, though it is normally closed by end wall 75, except for the passage of the motor shaft, as will be described.

The sides of hollow 84 are closed by removable caps 89 and 90 which, respectively, support ball bearings 91 and 92 for drive shaft 93, the latter extending through opening 94 in cap 90 toward the gun-side of the retracter and terminating in an integral sprocket 95 (Fig. 10).

Within hollow 84 and keyed at 96 to shaft 93 is worm wheel 97, the hubs 98 thereof holding it centrally disposed within the hollow (Fig. 10).

Within the horizontal bore 99 of hub 81 is a bodily shiftable shaft-and-bearing assembly generally indicated at 100 (Figs. 5 and 11). It consists of a cylindrical tube 101 carrying at its opposite extremities the ball bearings 102 and 103, through the inner races of which extends shaft 104; shoulder 105 and shaft-nut 106 engaging the outer faces of the inner ball races, while the outer races engage tube shoulders 107. The tube 101 slidingly fits the relatively restricted, vertical dimension of bore 99, but said tube may be bodily slid longitudinally of the elongated bore under certain conditions. The tube has a flange 108 engaging the inner face of hub 81, which face 109 has a longitudinally extending key-way 110 at the forward side of the hub, this key-way being adapted slidably to take a key 111 which is held in a slot of flange 108 by pin 113. Ring cap 112 is threaded on the end of tube 101 to hold bearing 102 and hence shaft 104 in assembly with the tube. At the outer end of the tube is threaded a clamping cap 114, a lock washer 115 (with bendable lock-lugs 116 adapted to be turned outwardly against the wrench-faces of cap 114) being interposed between the nut or cap 114 and the outer face 117 of hub 81, said face being longitudinally grooved at 118 to take the bent-over key portion 119 of washer 115.

Shaft 104 carries an integral sprocket 120, and a drive or retracter chain 121 is trained over sprockets 95 and 120. It will be seen that the tightness of this chain may be varied by bodily shifting assembly 100 toward or away from shaft 93, such movement varying the horizontal spacing between shafts 93 and 104. This shift is accomplished by adjustment of screw 122 which is threaded angularly through hub 81 (Fig. 5) the tip 123 thereof being pointed as illustrated, to present a conical face which will be substantially tangential to tube 101 in all its positions of adjustment. Jamb nut 124 is adapted to hold screw 122 in adjusted position, but it will be seen that by loosening nut 124 and cap 114, screw 122 may be screwed in to tighten the chain or may be screwed out to allow sprocket 120 to be moved rearwardly in a manner to loosen the chain, nut 124 and cap 114 being thereafter tightened to maintain the adjustment.

Chain 121 is a sturdy one of the roller, pin and link type, the rollers being indicated at 125, the links at 126 and the pins at 127. The upper course 128 of the chain (Fig. 12) is supported between sprockets 95 and 120 to prevent it sagging when certain strains are imposed thereon which tend to cause it to dip. This support or bridge consists of a bar or track 129 which immediately underlies rollers 125 and, in turn, is supported by horizontal studs 130 which extend through arm 80 and are clamped thereto by collars 131 and nuts 132 (Fig. 11).

Chain 121 carries one or more abutments or driving lugs. These are here shown as two in number, the timing of the device being such that lugs 133 and 134 alternately come into play, that is, a given lug performs its office during a given actuation of the charger while the other lug idles, and on the next actuation of the charger the other lug performs its office while said given lug idles. It will be understood, however, that the invention considered in its broader aspects is not limited to the use of any particular number of lugs, as the length of the chain and the timing thereof may be changed to suit the number of lugs actually used.

Since lugs 133 and 134 are identical, only one need be described in detail. Side bars 135 lie at opposite sides of the chain links and are connected by an integral cross-bar or pusher 136 having a forward abutment or thrust face 137. Each side bar has two points of connection with chain pins 127, the rearward connection being a simple pivotal mounting on pin 127a, while the forward connection is by way of a slot 138 which takes pin 127b, this assembly spacing the points of lug and chain connection three full links apart. The abutment face 137 is intermediate the points of pivotal connection and preferably slightly behind the forward point of connection when the lug is on the upper course of the chain.

It will be seen that while a given lug 133 is travelling along the upper course of the chain (dotted lines in Fig. 13) track 129 supports this chain so that lug face 137 extends vertically and in fully effective contact with bolt stud 45, but as that lug approaches the end of its upper course, it starts to drop quite abruptly (Fig. 13) the slotted or lost motion connection 138—127b making it possible for the lug to "turn" the relatively sharp curves offered by the chain as it goes over the relatively small-diameter sprockets. Thus, while the lugs are of sufficient effective length to receive most effectively the advancing force applied to them by the chain as they drive through their power stroke (that is, through the upper course of travel while they engage stud 45) they are so mounted that this length does not present turning or change-of-direction difficulties which might otherwise be expected.

The mechanism is so timed that under normal conditions the retracter remains at rest in the condition of Fig. 12, and while the gun is firing stud 45 will reciprocate through slot 46 without interference by the retracter. When the charger goes into action (meaning that stud 45 will have been brought to complete rest in the position of Fig. 12) chain 121 will travel in a clockwise direction (as viewed in Fig. 12), lug 133 being brought up behind and abutment shoulder 137 engaging the stud 45 and then driving it rearwardly of the gun to fully retracted position, this movement of the stud carrying bolt 28 to its rearward position and causing it to perform its normal recoil functions as described above. Just as the stud reaches this position of full retraction, lug 133 will be withdrawn or drop from behind the stud (Fig. 13) whereupon the stud and its bolt will be freed for forward movement under the power of driving spring 44, the bolt thus performing all its normal counter-recoil functions.

Before the retraction chain comes to rest after clearing stud 45 under the above conditions, it will have moved around to a position where lug 133 occupies the position formerly had by lug 134, while lug 134 will have been advanced to the position formerly occupied by lug 133 in Fig. 12, and hence, on the next actuation of the retracter, lug 134 will engage the stud to retract the bolt.

By shifting unit A with respect to carriage 51, as accomplished by the means previously described, the timing of the lug-and-stud engagement and release may be altered, it being obvious that such a shift will control the time of stud "pick-up" and lug "let-off" with relation to the start or finish of the retraction cycle.

The drive of retracter unit A, or more specifically of chain 121 from motor E, is accomplished as follows. One end 140 of the motor shaft extends through ball bearing 141 in end wall 75 and carries, within hollow 88, a pinion 142 keyed to the shaft and held against displacement therefrom by nut 143. Drive pinion 142 meshes with spur gear 144 on shaft 145, said shaft being journalled in bearings 146 and 147 carried by body member 61 at opposite ends of hollow 86. Keyed to shaft 145 is a worm W which meshes with worm wheel 97. The end of the worm also preferably abuts against thrust collar 145' on the shaft. The shouldering arrangement clearly shown in Fig. 5 and nuts 148 and 149 hold the worm-shaft unit positioned and in assembly. Nut 149 is pinned to shaft 145 and has an end slot 150.

Cap 151 is screwed into body member 61 to hold bearing 147 against shoulder 152 and also provides the mounting for a manual control whereby shaft 145 may be manipulated under certain conditions.

It will be obvious that motor operation will drive sprocket 95 through shaft 140, gears 142, 144, shaft 145, worm W, worm wheel 97 and shaft 93, thus setting up operative movement of the retracter, or, more specifically of chain 121 and lugs 133, 134.

Within neck 154 of cap 151 is plunger 155 which is in axial alignment with shaft 145. This plunger carries at its inner end a head 156 having cross-lug 157 adapted, at times, to be entered in slot 150 of nut 149. Normally, spring 158, interposed between 159 of plunger 155 and shoulder 160, tends to maintain the plunger in the position of Fig. 5, where it entirely clears nut 149. However, should occasion arise to advance the retracter chain 121 because it is out of time or because a power shut-off has interrupted the operation of the motor at a time when the driving lugs have failed to complete their full cycle of movement, or if any other reason appears for manually actuating the retracter, a screw driver may be entered in plunger notch 161 and the plunger then thrust inwardly until lug 157 engages slot 150, whereupon turning of the screw driver will cause rotary movement to be imparted to shaft 145, and thus, through the worm drive, serve to actuate the charger chain.

Or, of course, by manually rotating shaft 145 reversely, the charger chain may be "backed-up," during which operation pin 145", extending through shaft and worm, serves to take the longitudinal thrust of the worm.

Motor unit C includes a casing made up of three sections 76, 162 and 163, sections 76 and 163 being cup-shaped and including end walls 75 and 164, respectively, and the central section 162 being ring-shaped and having lap-joint connections 165 with the adjoining sections. The sections are clamped together by bolts 166 and hollow, internally threaded screws 167, bolts 166 being threaded within end walls 75 and screws 167 having their heads counter-sunk in end wall 164. The bolt and screw system also serves to support various elements of motor E in fixed position. Motor-field 168, spacer 169 and brush-carrying plate 170 are fitted over bolts 166 and clamped in assembly against casing shoulder 171 by nuts 172, this motor assembly being made prior to the assembly of sections 162 and 163. Thereafter the last named two sections are applied in end to end relation and clamped in place by threading screws 167 over bolts 166, resilient washers 173 interposed between nuts 172 and the ends of screws 167, yielding to allow said screws to be threaded completely home to clamp the casing sections firmly in assembly in spite of possible slight longitudinal inaccuracies, and yet filling the space between nuts 172 and screws 167 to prevent said nuts from backing off.

End wall 75, and hence all the casing sections and contained parts, are held to unit B by nut 74 (Fig. 5) as previously described, and by angularly extending cap-screws 173' (Fig. 3) which extend through attachment flange 76.

End wall 164 carries ball bearings 174 which are held from bodily movement to the left by flange 175 and from bodily movement to the right (Fig. 5) by disk 176, which disk, in turn, is held against both rotational and longitudinal displacement by means to be described and is thus adapted to hold screws 167 from backing out accidentally.

It becomes important when the circuit to motor E is broken after stud 45 has been retracted by action of unit B, that the "coast" of the motor be checked to prevent an over-drive of the retracter which might otherwise bring lugs 133 and 134 beyond their proper starting positions. Therefore, to establish within safe limits the extent to which the motor may coast and to prevent "creeping" at all times while the charger is out of operation, I prefer to provide braking means, here generally indicated at F, which goes into play as the motor circuit is broken and remains effective until that circuit is re-closed. As a particularly effective means for controlling the release and application of the brake, I employ an electromagnet which is in series with the motor circuit, so, as the motor circuit is closed the brake is magnetically released and, when the motor circuit is subsequently reopened, the magnet is de-energized and the brake is again put under the influence of a brake-applying spring.

As preferred brake and brake control means, I have provided the following mechanism, though it is to be understood this is not limitative on the broader aspects of the invention. The motor armature 177 and commutator 178 with their shaft extensions 140 and 179, are capable of limited end-play, pinion 142 being of such width to remain in full effective mesh with gear 144 throughout such movement.

Sleeve 180 on shaft extension 179 has press-fit within the bore of the inner race of bearing 174 and about this sleeve is a compression spring 181 which is interposed between that inner race and collar 182 on said shaft extension. At the opposite side of bearing 174, the shaft extension carries a keyed, metallic brake disk 183 which is held against longitudinal movement on the shaft by shoulder 184 and nut 185. The inner face of this disk is directly opposed to a ring 186 of brake lining or the like, which is held within recess 187 of disk 176.

Spring 181 exerts constant tendency to thrust the motor shaft and all the elements carried thereby toward the left in Fig. 5, thus tending frictionally to engage disk 183 with brake ring 186 and serving to hold the motor against free rotation.

The brake is released by the electromagnetic means generally indicated at G which is mounted within barrel 188. This barrel, together with junction box 189, is held to motor casing wall 164 by screws 190 which extend through inturned flange 191 on box 189 and also through brake disk 176 (Fig. 8) to hold the latter against rotation, said disk being held against longitudinal displacement by its interposition between end wall 164 and the inner end of barrel 188. Barrel 188 has an annular flange 192 adapted to center it within box-flange 191, and its bore is internally threaded at 193 to take ring-cup 194. Within cup 194 is ring 195 having externally threaded ring-flange 196, ring 195 being held within cup 194 by annulus 197 which has shoulder engagement 198 with the upper end of flange 196 and its lower end being grooved and headed over at 199 to hold it to the cup. Pole-piece 200 is in the form of a ring having a central tubular portion 201 threaded over flange 196, ring 200 confining coil 202 between its underside and the insulating ring 203. The entire group of magnet elements so far described is held in assembly by heading over the upper peripheral edge of cup 194 as at 204

Insulating ring 203 is grooved at 205 to take heads 207 of terminals 208 and 209, which terminals are thus held against end-wise play by the interposition of the heads between the grooved bottom and the side of coil 202, it being understood that the terminals are inserted during the previously described assembly of the magnet elements. The heads are cut arcuately at 210 to fit the curve of groove 205, the resulting inter-engagement preventing rotation of the terminals.

The shanks 211 of the terminals extend through insulating bushings 212' which, in turn, extend through members 195 and 194 (Fig. 5), and heads 207 are electrically connected, one each, to opposite ends of coil 202 by wires 212 and 213 so, by closing the circuit leading to terminals 208 and 209, coil 202 is energized and thereupon acts through pole-piece 200 to draw brake disk 183 to the right (Figs. 5 and 8) against the action of spring 181 and thus clears that disk (which can be considered both a magnet armature and a brake member) from braking engagement with friction ring 186, freeing the motor for rotation. Engagement of collar 182 with the end of sleeve 180 limits the endwise movement of shaft 179 and parts carried thereby. When the circuit to terminals 208 and 209 is broken, coil 200 is de-energized and spring 181 acts to thrust the motor armature and shaft to the left in Fig. 5, and thus re-applies the brake by frictionally engaging disk 183 with ring 186.

Contact shanks 211 extend through and beyond plate 214 and plug 215, both plate and plug being circular and made of insulating material. The exposed ends of shanks 211 provide binding posts for the attachment of the coil-energizing wires, and the plate and plug are held against accidental displacement by nuts 211' threaded on shanks 211. Plug 215 also has a flange 216 adapted to overlie the heads of screws 190 to prevent said screws from accidental backing-out.

Plug 215 also carries terminals 217 and 218 (Fig. 6) to which other circuit connections are made, as will later be described, and they are preferably molded in the plug, being held against rotation by knurled heads 219. The interposition of plate 124 between said heads and cup member 194 insures proper insulation.

Junction box 189 is made up of a substantially cylindrical portion 220 and a riser 221. As has been described, the box is held to barrel 188 by screws 190. Its cover plate 222 is detachably held in place by screws 222' and is provided with a hollow neck 223 through which the various wires from the outside may be drawn. The neck is threaded to take a fitting 224 whereby the wire-carrying conduit or sheath 225 may be detachably fixed thereto.

Motor casing section 162 carries an integral elbow 226 which, through unions 227 and 228, is connected through conduit 229 to the nipple 230 which opens into the compartment 231 of box 189, the conduit providing an enclosing shield for wires running from the box to the motor. Nipple 232 provides an outlet for wires from compartment 231 to conduit 233, which is coupled to nipple 232 by union 234 and leads to priming unit D. The various wires running to the junction box and from that box to the various terminals will later be described.

I have provided means whereby (when the gun is out of action by reason of a defective cartridge or by reason of an empty chamber) the circuit to motor E may be closed to accomplish retracter actuation as described above, together with means for rebreaking that circuit when the retracter completes its work.

To this end, I provide the switch mechanism generally indicated at D which is associated with the motor circuit, the switch remaining open while the gun is wilfully kept out of action but being put under the power of a force tending to close it as soon as the gun goes into action, though it is held against actually closing as long as the gun fires normally. In the preferred embodiment of the invention, the closing of this switch is not fully effective by itself to close the motor circuit, it acting only as a relay to control a second and final motor switch. However, for the purpose of this generalized discussion of the make-up and functioning of the priming switch and also in connection with certain of my broader claims, the switch may be considered as being a direct control for motor E, and, in fact, I will later describe a variational form wherein it is so adapted to act.

Switch D has an element disposed in the path of the stud 45 and, while the gun is firing normally, as the stud approaches the end of its recoil stroke it acts against this element in a manner to hold the switch open. Immediately the stud starts its counter-recoil movement, the element starts to move in a switch-closing direction, but its movement is relatively slow or delayed, so, if the gun continues to fire, the stud will have returned to recoil position before the switch is closed and will immediately reengage the element and return it towards its full retracted position. Thus, as long as the gun fires, the reciprocating stud keeps the switch open and the motor E consequently remains at rest.

However, if, during the firing of a burst, a defective cartridge is chambered, or if chamber 21 is empty, bolt 28 will remain in its forward position and stud 45 will come to rest in the position of Fig. 12. Then, since there is now no force available to check the closing movement of switch D, that switch closes and cuts in the motor in a manner to actuate retracter B, as has been described.

The subsequent action will be later described, but the foregoing will suffice to explain that stud 45 (which may also be considered as a part of bolt 28) has not only the office of taking the drive from the retracter but also acts as a tappet for controlling the priming or delay switch D. It will also suffice to explain why I have used the term "priming" to distinguish this particular switch, for it will be seen that during the time the gun is firing normally, the switch is in movement and, while it is not then effective to put the recharger motor into operation, it puts the recharger circuit into a condition of readiness for instant action to initiate recharger-actuation in the event of a stoppage.

It is also to be noted that while stud 45 is here used as a tappet, any suitable element on bolt 28 may be utilized for the purpose (I will later describe such a one) and therefore it is not essential to the invention, considered broadly, that the stud have this dual function of a cocking member and a switch-tappet.

Delay switch D has a tubular housing generally indicated at 234 having a horizontal attachment arm 235 adapted to be detachably held to attachment flange 78 of body member 61 by bolts 236. Housing 234 is made up of two sections 237 and 238, section 238 being in the nature of a cap attached to section 237 by screws 239.

The switch, proper, is indicated generally at 240 and includes a pair of upper and lower insulating blocks 241 and 242, respectively, the dividing line between blocks being indicated in Fig. 14 at 243. The blocks are held against endwise displacement in one direction with respect to casing 234 by engagement of their flange shoulders 244 (Fig. 18) and 245 (Fig. 17) with housing shoulders 246 and 247, respectively, and against displacement in the opposite direction by member 248, to the flange 249 of which the blocks are secured by screws 250. The mounting of member 248 and the manner in which it is held against displacement will be later described.

Blocks 241 and 242 define the opposite sides of bore 251, reduced-diameter bore 252 and counterbore 253; and substantially midway of the blocks is a horizontally extending passageway 254 which is of rectangular cross-section and opens to bore 251. The side faces defining the passageway are indicated at 255 and 256. Extending vertically across passageway 254 and arranged against face 255 at horizontally opposite sides of bore 252, are switch contacts 257 and 258, which are screwed to block 242 at 259. Terminal sockets 260 and 261 are extended through block 241 and project downward at 262 and 263 into threaded engagement with contacts 257 and 258, respectively. Conductor bar 264 is also in electrical contact with socket 260, and leads to terminal screw 265 (Fig. 15) for a purpose later to be described.

It will be seen that contacts 257 and 258 are insulated one from the other and from casing 237, but faces 266 and 267 are in a common vertical plane.

At diametrically opposite sides of housing 237 are threaded apertures 268 and 269. In Fig. 17 only the upper aperture is in use, the lower one being closed by a removable screw-threaded plug 270 having threaded and screw-slotted shank 271. A cover plate 272 over the outer face of the plug is held against the outer face of housing 237 by washer 273 and pinned-nut 274. When occasion arises for reversing the gun from a side feed of given hand to a side feed of the opposite hand, plug 270 and all elements carried thereby are shifted from aperture 269 to aperture 268, and the elements shown in Fig. 17 as entered in aperture 268 are shifted to aperture 269, the plugs 241 and 242 having been first rotated through 180° to present the open mouths of sockets 260 and 261 toward aperture 269.

Connection plug 275 is entered in aperture 268 and is made up of a nipple portion 276 having a flange 277 (Fig. 17) overlying housing 237, and enclosing insulated body 278 which carries three split prongs 279, 280 and 281; prongs 279 and 280 being adapted snugly to fit sockets 260 and 261, respectively, and wires (later to be designated) leading from these prongs through conduit 233 to the interior 231 of junction box 189, union 282 forming a detachable connection between nipple 276 and conduit 233. Screws 283 extend through flange 277 (Fig. 4) to hold nipple 276 detachably to housing 237, and the underside of the housing is provided with screw holes (not shown) to provide for attachment of the nipple when it is entered in aperture 269.

It will be seen that the socket and prong arrangement just described, provides a slip-joint connection whereby plug 278 may be readily disconnected from the contacts of switch 240 upon occasion arising for reversing the parts of the priming switch when the gun-feed is reversed, and that when the plug is thus detached and dummy plug 270 is removed, the entire body, represented by the assembly of blocks 241 and 242 and their switch elements may be rotated through 180°.

Extending through bores 251, 252 and 253, is a plunger generally indicated at 285. The plunger includes a rod 286 on which is threaded a sleeve 287; the rod and sleeve also being pinned together at 288 to prevent their relative rotation after being assembled. Slidably mounted on rod 286 is switch-blade-carrier 289 made up of insulating plates 290 and 291 which confine between them rectangular switch blade 292, the latter extending through passageway 254 and being of a length to bridge between and engage faces 266 and 267 of contacts 257 and 258, respectively. It will be noted that carrier plate 291 has a bushing portion 293 which insulates blade 292 from rod 286.

Interposed between carrier 289 and a washer 294 which abuts rod-shoulder 295, is a coil spring 296 which tends yieldably to hold carrier 289 against the end of sleeve 287. When rod 286 is in normal position (Fig. 17) blade 292 is spaced to the right from contacts 257 and 258 and switch 240 is thus maintained in open condition so there may be no current-flow between contacts 257 and 258. When, however, rod 286 is moved to the left (Fig. 18) plate 292 engages and electrically connects contacts 257 and 258, switch 240 thus being closed. Spring 296 maintains this plate-and-contact engagement but is adapted to yield sufficiently to compensate for possible over-throw of the rod when it moves to the position of Fig. 18.

The closing of switch 240 serves either directly or indirectly to close the circuit to motor E; in the preferred embodiment, the closing of switch 240 closes a circuit to an actuating solenoid which, when thus energized, acts on a control switch to close the motor circuit—all of which will be later described.

I will now describe the means for actuating switch 240 upon the opening or closing of the priming or readiness circuit (later to be designated) which, as will appear, is controlled by movement of the firing trigger, to be later described.

Threaded and pinned to rod 286 at 296, is an extension 297, there preferably being interposed a washer 298 between the end of the extension and rod shoulder 299. This plunger extension 297 acts both as a piston and as the core or movable armature of the priming-switch actuating-solenoid generally designated at 300. Solenoid coil 301 is wound, with intervening insulation 302, upon tube portion 303 of member 304, said tube providing a guide-way for core 297. Tube 303 and member 248 are detachably held together, with insulating ring 305 in contact with flange 249, by headed bushing 306, the latter forming a guide for rod 286 and being threaded into the end of tube 303 at 307 in a manner to clamp flange 249 between bushing head 308 and the end of tube 303. Coil 301 is insulated from member 248 at 309 and from washer 310 at 311.

Insulating ring 305 is grooved at 312, the open end of the groove being covered by insulating washer 313. Terminal shanks 315 and 316 extend from groove 312 through ring 305 and flange 249 into insulating block 242, bushings 317 insulating said shanks from member 248. Contact heads 318 and 319 on terminals 315 and 316, respectively, lie within groove 312, being arcuately cut at 320 to fit the groove wall, the resulting engagement preventing rotation of the terminals. Heads 318 and 319 are connected by wires 321 and 322, which extend through insulating washer 313, to the opposite ends of coil 301.

Screws 265 and 323 (Figs. 15 and 17) extend through block 241 and are screwed into threaded bores provided in the shanks of terminals 315 and 316, respectively, said screws thus being adapted to serve as binding posts for the associated terminals. It has already been noted that screw 265 extends from conductive bar 264, so it will be seen that terminals 279 and 315 are in circuit. Conductor bar 324 leads from screw 323 to terminal socket 325, which is supported in block 241 in the manner clearly shown in Fig. 17. This socket is adapted to take split prong 281 which has already been described as being carried by connection plug 275. It follows that connection between socket 325 and prong 281 is accomplished at the same time connection is made between prongs 279, 280 and their sockets 260 and 261, respectively.

A hold-down and insulating strap 326 overlies the heads of screws 265 and 323, being, in turn, detachably held to block 241 by screw 327.

Cap 238 engages flange 328 of member 304 and thus serves to hold the entire switch and solenoid assembly clamped in the position of Fig. 17, but upon occasion for inverting this assembly to adapt the mechanism to a gun-feed of opposite hand, cap 238 may be temporarily loosened and the entire assembly rotated through 180° to its new position.

Member 303 includes a rearwardly extending cylinder portion 330, the bore thereof being indicated at 331. Cap 238 fits cylinder 330 snugly at 332 but is annularly spaced therefrom at 333, relief ports 334 and 335 extending from bore 331 to space 333. Piston head 336 is integral with plunger section 297 and preferably has ring packing 337 within its annular groove 338. The piston head divides bore 331 into chambers 339 and 340.

Spring 341, interposed between cylinder head 342 and piston head 336, tends normally to urge the entire plunger 285 to the right or position of Fig. 17, detachable cylinder head 343 serving as a positive stop to limit such plunger movement. When switch 240 is open, solenoid 300 is de-energized, and spring 341 holds the parts in the position of Fig. 17.

Cylinder head 343 carries an exhaust valve generally indicated at 344 and an adjustable depression-relief valve 345, the head itself being screwed at 346 within the end of cylinder 330 with a packing ring provided at 347. Head 343 has a bore 348 into which is threaded a nipple 349, the nipple being held against endwise movement by shoulders 350 and 351. Threaded into the counter-bore 352 of head 343, is the tubular neck 353 of cup-member 354, the wall 355 of this member being centrally apertured at 356, and its flange 357 engaging washer 358 which is fitted within end wall 359 of cap 238. This washer holds in place a dirt filter or screen 360 which extends across ports 361 in end wall 359 and also prevents displacement of member 354.

Spring 362 normally yieldingly holds valve disk 363 against the end of nipple 349, thus closing off nipple bore 364 from counter-bore 353. Extending from cylinder chamber 340 is a restricted, angularly extending passageway 365 which opens to counter-bore 352, needle valve 366 serving to regulate the effective size of the passageway. The needle valve is rendered adjustable by way of its enlarged body portion 367 which is screwed in horizontal bore 368. Screw 367 has a head-slot 369 which is accessible for application of an adjusting tool inserted through hole 370 in cup-wall 355, assuming, of course, that cap 238 has been detached as a preliminary step.

When solenoid 300 is energized, plunger 285 and all parts carried thereby are drawn to the left, as viewed in Fig. 17, towards the position of Fig. 18—that is, in a direction tending to close switch 240. However, this plunger and switch movement is retarded or delayed in that the cylinder and piston act together as a dash-pot unit in a manner described as follows. As piston head 336 moves through the cylinder, the air in cylinder chamber 339 is exhausted through port 334, space 333, opening 370 and ports 361. The resistance to such air-flow and the pressure of spring 341 tends somewhat to retard plunger-movement under the impulse of the solenoid, but main reliance for the desired delay action is based on the fact that left-wise movement of the piston head creates a depression in cylinder chamber 340, and only as this depression is relieved by the passage of air at atmospheric pressure through ports 361, 355 and passageway 365, is the plunger and its parts free to move toward the position of Fig. 18. By adjusting valve 366 to control this depression-relief, one may regulate the speed at which the plunger is allowed to move left-wise under the power of the solenoid, and thus the timing of switch 240 may be controlled. Preferably, however, port 335 is in such location that as the piston head nears the end of its stroke, said port is uncovered by the piston head and the consequent sudden relief of the depression in chamber 340 allows the plunger to snap quickly to the position of Fig. 18, the increasingly effective magnetic pull of bushing 306 on plunger 297 as the latter moves to the left, contributing to the snap-action. The timing will be such that switch 240 will not be closed during the period elapsing between the instant the stud 45 moves from its position of full retraction and returns thereto under normal firing conditions.

In Fig. 18 it has been assumed, however, that plunger 285 has been allowed to travel its limit under solenoid-impulse—meaning that switch 240 is closed and that motor E has been put in circuit. Upon de-energization of solenoid 300 or upon stud 45 driving plunger 285 back toward the position of Fig. 17 (as it may also do during normal firing of the gun even though the plunger has not travelled sufficiently far to the left to close switch 240) the air within cylinder chamber 340 is exhausted, first, through port 335 and then, by forcing disk 363 open against the action of spring 362, through nipple 349 and port 356. Relief port 334 prevents the creation of a depression in cylinder chamber 339.

Instead of extending a rigid portion of plunger 285 into the path of stud 45 (it being realized that this stud reciprocates at tremendous speed during firing of the gun and that it must act against the plunger once during each of its strokes in order to prevent switch 240 from closing) I prefer to provide a telescopic, yieldingly-held connection generally indicated at 375 between the plunger, proper, and the portion thereof which is acted upon directly by stud 45. Thus, I have enlarged sleeve 287 to form a barrel 376 which has a flange 377 adapted to engage housing bushing 378 to limit the left-wise (Fig. 18) or switch-closing movement of the plunger 285. Within bore 379 of barrel 376 is a nose-piece or impact member 380, the bushing 381, which is positioned by opposed shoulder 382 of barrel 376, serving both as a guide for the cylindrical body portion 383 of the nose-piece and also as a stop against which the head 384 of the nose-piece is yieldingly held by spring 385. An integral tip or extension 386 on rod 286 positively limits the extent of nose-piece movement in the opposite direction.

Normally, telescopic joint 375 is fully extended by spring 385. When the gun is firing and consequently solenoid 300 is constantly tending to move plunger 285 to the left or towards switch-closing position, nose-piece 380 will be constantly projected into the path of the stud, but spring 385 will, by allowing a degree of relative telescopic movement between plunger, proper, and nose-piece 380, take the shock of the repeated impacts of the stud and will obviate the necessity of suddenly checking the bodily left-wise movement of the plunger 285 and, as suddenly, driving it back to the right, or against the power of solenoid 300. However, spring 385 is sufficiently stiff and the travel of the stud after it has first engaged the nose-piece is of such extent, as will insure that the plunger will be moved bodily sufficiently to open or keep open switch 240, rather than merely taking up all the nose-piece movement by collapsing telescopic joint 375. Furthermore, the spacing between the nose-piece and tip 386 is such that the joint cannot collapse to an extent which will allow all the driving force to be taken up in telescoping joint 375.

It will be seen that by shifting units B, C and D longitudinally of carriage or adapter 51 by adjustment of nut 69, the normal position of nose-piece 380 may be varied with respect to stud 45, so the impact of the stud with the nose-piece will occur earlier or later in the retractive stroke of bolt 28.

Should the gun-feed be reversed hand-for-hand, stud 45 and trigger solenoid 35 are transferred to sides opposite those they occupy in Fig. 4, and recharger A will likewise be shifted to the opposite side. This is accomplished by taking the following steps.

Mounting bolts 16 and 17 are turned end-for-end so they project from the opposite sides of mounting brackets 19, and carriage 51 is re-mounted on the bolts.

Retracter shafts 93 and 104 are turned end-for-end to bring their sprockets and chain 121 in proper relation to stud 45 in its new position, it being obvious that caps 89 and 90 may be exchanged one for the other and that the entire bearing and shaft assembly 100 may be bodily turned end-for-end within hub bore 99 to accommodate this change. Track 129 is transferred to the opposite side of housing 61 by transferring bolts 130. Nipple 276 is detached from housing 237 and attachment bolts 236 are removed to free switch D from attachment flange 78, whereupon plug 279 is removed and the plug-and-switch assembly within housing 237 is rotated as has previously been described.

Plug 270 is then inserted in aperture 268 and casing 237 re-attached through arm 235 to flange 78 but so it now extends at the side of body member 61 opposite to that it occupies in Fig. 4, thus bringing nose-piece 380 into proper relation with stud 45 in its new position. Nipple 276 is then reapplied to casing 237 which restores the electrical connections between the contact elements of plug 275 and block 241.

The diagrammatic showing in Fig. 40 of the elements of the left-wing gun and recharger, indicates the parts in the described reverse position.

The above matter completes the description of the structural features of the gun-carried mechanism. However, employed in the control system are various other mechanisms and switch devices and while they may be located at any suitable place, I have indicated diagrammatically in Fig. 40 their preferred placement. In this figure the area S represents the left-wing, area T the right-wing and area U the cock-pit.

A control box for charger A is indicated generally at 390, and preferably it is carried in wing T at a point adjacent gun 10, though this particular placement is not essential. The box is structurally shown in Figs. 19 to 23, inclusive. It includes a stationary housing section 391 and a removable drawer or slot section 392. Section 391 is made up of casings 393 and 394 which are riveted together at 395, the rivets also supporting contact panel 396 made of insulating material and dividing the compartment 397 defined by casing 393 from compartment 398 defined by casing 394. Nipples 399, 400 and 401 extend through and are secured to wall 402 of casing 394 by nuts 403, fittings 404 connecting nipples 399, 400 and 401 to flexible conduits 405, 406 and 407, respectively, whereby wires enclosed within said conduits may be led into compartment 398. In the present case, conduit 405 carries the wires to trigger solenoid 35, conduit 406 the wires to cock-pit U, and conduit 407 the wires to recharger A. The various wires are attached to appropriate binding posts on panel 396, said posts being individually indicated at 408, 409, 410, 411, 412, 413, and 414; the wires thereto and therefrom will be identified later.

Figs. 22 and 23 show the make-up of a typical binding post. Thimble 415 extends through panel 396, its external flange 416 engaging washer 417 on one panel face, while its bore 418 opens toward the opposite face. Entered in said bore is socket-piece 419, its socket 420 opening endwise through the integral head 421. This head preferably has external peripheral flats 422, while the socket-piece 419 is milled flat at 423 to take a spring clip 424 pinned thereto at 425, and having a detent portion 426 which projects radially through slot 427 into bore 420. The opposite end of socket-piece 419 forms an integral-threaded post 427 which extends through and beyond the end of thimble 415, where it takes nut 428 by which attachment of the lead wire is made. The flats 422 of head 421 fit within groove 429 of panel 396 and the socket-piece 419 is thus kept from turning while nut 428 is tightened in a manner serving to clamp the socket and thimble assembly detachably to panel 396, the clamping being effected between thimble flange 416 and socket-piece head 421.

Drawer or slide section 392 or box 390 is made up of insulating material, the side walls 431 and end walls 432 and 433, being in the form of an integral, rectangular frame to which closure plates 434 and 435 are detachably secured at 436. Plate 434 is used as a base upon which the contained switches are mounted, while plate 435 is used as a removable cover. End wall 432 is relatively thick and serves as a panel to take terminal members 437, 438, 439, 440, 441, 442, and 443, there being one terminal for each of the terminal members mounted on panel 396. A typical terminal comprises a stud 444 extending through panel 432 and clamped thereto between collar 445 and attachment clip 446 which is held to one panel face by washer 447 and nut 448. To simplify the showing and later description, the numbers applied to the attachment clips in Fig. 20 will be considered as the numbers designating the terminals carried by panel 432. A typical stud 444 also includes an integral pin or plug 449 adapted to be thrust into socket 420 and releasably held therein by detent 426 which is taken within pin notch 450.

The wires which extend from terminals 437 to 443, inclusive, to the various instruments within compartment 450 of slide 392, are omitted from Fig. 20 in order to avoid confusion, but are diagrammatically illustrated in Fig. 40, in connection with the description of which a full identification of the connections will be made.

Slide 392 is releasably held in the position of Fig. 20, with all its terminals in contact with the corresponding terminals or binding posts of panel 396. The holding means includes an external metal face plate 451 secured to slide wall 433 by screws 452, and the plate extends over and is removably secured at 453 to the insulated flanges 454 of casing 393. By removing screws 453 and applying a pull-out tool to threaded socket 455 in wall 433, slide 392 may be bodily withdrawn from casing 393; clips 424 yielding to allow the extraction of posts 449 from sockets 420. Thus, should occasion arise for inspection or repair of any of the instruments within compartment 450, those instruments are rendered accessible by merely withdrawing the slide and detaching cover 435, and yet when the slide is re-inserted in the casing a direct thrust on face plate 451 serves to reengage all the terminals carried by the slide with their proper binding-post sockets.

Within slide-compartment 450 are carried the following devices—control switch H, circuit breaker J and thermostatic switch K.

I will first describe the structure of control switch H. This switch contains contact making and breaking elements mounted for movement under the impulse of a single plunger, though certain of them play a part in several different circuits. This use of a single actuating plunger and hence of a single plunger-moving solenoid, is done partially for the sake of space and economy, but the showing of this employment of a single solenoid is not to be considered as in any way limitative except where expressly set forth in the claims. Of course, certain of the combinations and interconnection of elements yield marked advantages and therefore are, in themselves, properly the subject-matter of certain claims.

The structural details of switch H are shown in Figs. 26 to 34, inclusive, with a few of the elements shown only in Fig. 20. Three square blocks 455, 456 and 457 of insulating material and having coaxial bores 458, 459 and 460, respectively, are spaced apart by insulating spacers 461 and 462. The blocks and spacers are held in assembly by through-bolts 463 (Figs. 20 and 29) said bolts also being threaded into member 464 of the solenoid unit generally indicated at 465 to hold that unit in assembly with the blocks.

The several blocks fit snugly between plates 434 and 435 and are detachably held to plate 434 at 466 (Fig. 29). Solenoid member 464 and solenoid case 467 are substantially cylindrical though they are preferably flattened as at 468 (Fig. 28) to fit snugly between plates 434 and 435, screw 469 serving to hold case 467 to plate 434.

Applied to block 455 are contacts 470 and 471; at one side of block 456 are applied contacts 472 and 473; at the other side of block 456 are applied contacts 474 and 475; and applied to block 457 are contacts 476 and 477. The several contacts and the mountings thereof are identical, so it will be necessary to describe only one in detail and to associate that one with the companion contact on the same block. I will describe contact-pair 470, 471 on block 455. Each contact is made up of an arcuate plate 480 with a substantially radially extending leg 481 and an angularly turned ear at the outer end of said leg. For convenience, the ears of the several contacts are designated by the same reference numeral, plus a prime mark, as that of the associated contact.

Preferably, the insulating blocks are molded about the contacts, legs and ears which they support, though the outer faces of these elements are exposed and preferably the several blocks are grooved at 482 between the contacts of each associated pair to insure that the insulation may not project in a manner to interfere with full contact of the switch blades to be later described. In order firmly to anchor the contacts to their associated blocks, said contacts carrying rivets 483 (Fig. 26) whose key-flanges 484 are imbedded in the block when the latter is molded about the contact.

The contact ears each carry a binding post screw such as 485, but these screws will not be individually identified since, for convenience, they may be considered part of the contacts with which they are electrically associated and it will be more convenient and understandable hereafter to refer only to the essential element, namely, the contacts. However, these screws serve as connections for certain wires, later to be described, which put these contacts in certain circuits. I have also shown a conductor bar 486 connecting ears 471' and 475'; and conductor bar 487 connecting ears 470' and 473', but these bars will hereafter be more generally considered as connecting the contacts—that is, bar 486 connects contacts 471 and 475, while bar 487 connects contacts 470 and 473.

Mounted on the longitudinally reciprocable plunger generally designated at 488, are switch blades 489, 490 and 491, respectively, the particular nature of their mounting being later described. The blades are in the form of disks of a little less diameter than the particular contact pairs (such as 470–471) which they are adapted to engage at times, the specified relative diameters insuring that the insulating material surrounding the outer peripheral edges of the contacts will not interfere with full facial engagement between those contacts and the opposing blades.

As will be explained, at times disk 489 is adapted to be moved into and out of engagement with contacts 470 and 471 to close the circuit within which said contacts are included, and therefore blade 489 and contacts 470 and 471 together will be considered as "feed switch" 492. The same relationship exists between blade 490 and contacts 472 and 473, which therefore will be considered together as "trigger by-pass feed switch" 493; the same relationship exists between blade 491 and contacts 474 and 475 which therefore will be considered together as "firing circuit switch" 494; and the last mentioned blade also has the same relationship with contacts 476 and 477, so it will be considered, with said last mentioned contacts, as "motor switch" 495.

Plunger 488 consists of central rod portion 496 having at one end an enlarged-diameter portion 497, while a collar 498 is threaded and pinned at 499 to the opposite end of rod portion 496. To the right of collar 498 (Fig. 26) rod portion 500 is of slightly reduced diameter and terminates in a threaded extension 501 of still further reduced diameter. Slidably mounted on rod-portion 496 are bushings or blade-carriers 502 and 503, bushing 502 being of insulating material, while a third bushing or blade-carrier 504 is slidably mounted on rod portion 500. Secured between shoulders 505 and 506 on bushing 503 are insulating rings 507 and 508 and metallic retention ring 509, this assembly making up a sliding carrier for blade 491 which is confined in the groove 510 defined between ring flange 511 and ring 508.

Insulating bushing 502 has a flange 512 at one end, while insulating washer 513 is interposed between its other end and collar 498, spring 514 between the washer and flange yieldably urging blade 490, which is slidably mounted on bushing 502, toward flange 512.

Clamped between flanges 515 and 516 on bushing 504 are insulating rings 517 and 518 (which confine blade 489 between their opposing shoulder-faces 519 and 520, respectively) and cam-piece or releasable keeper 521; bushing 504 thus acting as a slidable carrier for both blade 489 and keeper 521 which are thus bodily movable as one.

Screwed on rod extension 501 and, under certain conditions, providing a thrust shoulder 522 for actuating keeper 521 and hence blade 489, is a collar 523, this collar being guided in bore 524 of bushing 525, said bushing being threaded at 526 into hub 527 which is integral with block 455. Collar 523 is held against rod shoulder 528 by lock washer 529 and handle 530, the latter being screwed on extension 501 and projecting through wall 433 and face plate 451 of the control box so it is accessible for external manual actuation of plunger 488 under certain conditions.

In the normal position of Fig. 26, plunger 488 is yieldably held to the right by spring 531, as will be described, collar 498 thus holding the carrier for blade 489 in such position that switch 492 is closed. But it is necessary that this switch be releasably held closed for a certain period after plunger 488 has started to move to the left, and I utilize the following means for so holding it.

At diametrically opposite sides of block 455, are provided detent-assemblies generally indicated at 532, these assemblies being identical. Each assembly is made up of a plunger 533 slidable within bore 534 of screw 535 in block 455, the plunger being yieldably held in extended position by spring 536. When control switch H is in normal condition (which is represented in Figs. 26 and 31) detents 533 are projected against the relatively sharply angled cam-face 537 on keeper 521 and thus tend to urge that keeper and blade 489 to the right in those figures and thus maintain full engagement between blade 489 and contacts 470—471. This engagement is maintained (Fig. 32) until plunger 488 has moved sufficiently to the left, first, to engage blade 490 with contacts 472—473 (as will be described) and next to engage collar 523 with keeper 521, whereupon that collar will move the keeper to the left. Under the force of collar 523, cam-face 537 will telescope detents 533 and, by the time the plunger has moved to the limit of its left-wise movement (Figs. 27 and 33) the detents will have ridden on to the relatively slowly angled conical cam-face 538. The detents will then releasably hold switch 492 open until plunger 488 has returned a sufficient distance to the right or towards the position of Fig. 26, to re-engage collar 498 with bushing 504, whereupon continued plunger movement will close switch 492 and return keeper 521 and detents 533 to the position shown in Figs. 26 and 31.

Interposed between rod shoulder 539 and bushing 503 is spring 540, while between bushings 503 and 502 is spring 541. With control switch H in the normal position of Figs. 26 and 31, spring 540 yieldably holds switch 494 closed and switch 495 open, while spring 541 yieldably holds switch 493 open. When plunger 488 moves toward the position of Fig. 27, collar 498 acts through bushing 502, spring 541 and bushing 503 to open switch 494 and close switch 493, switch 492 remaining closed (due to the detent action described above) and switch 495 remaining open due to the resistance offered by spring 540 during this initial plunger movement (Fig. 32). It will be noted that at this period, both switches 492 and 493 are closed.

Continued plunger movement acts through collar 523 to open switch 492, and switch 495 is closed by bushing 502 in its continued movement after blade 490 has engaged contacts 472—473 and the consequent pressure exerted through spring 541; switch 492 remaining open and switch 493 remaining closed (Figs. 27 and 33).

Upon initial return movement of plunger 488, switches 494 and 492 remain open and switch 493 remains closed, but switch 495 is opened (Fig. 34). Upon continued plunger-movement (or it may be practically simultaneously with the opening of switch 495) switch 493 is opened—but in any event the opening of switch 493 is accomplished before switch 492 is closed, for reasons which will later appear. The final return movement of plunger 488 closes switches 492 and 494, thus returning the entire control switch H to the condition of Figs. 26 and 31.

It will be seen that the blade-pressing springs 514, 540 and 541 are arranged so they compensate for any over-throw of plunger 488 and that the type of contacts shown in Fig. 30 and the flat faces of the switch blades are such that they may be easily machine to insure broad, smooth contact surfaces which contribute to efficient switch operation.

Plunger 488 is moved from the position of Fig. 26 to that of Fig. 27 by a solenoid 465. This solenoid includes the previously mentioned cup-casing 467 and member 464, the latter consisting of tube portion 545 and flange portion 546, the inner end of the tube fitting in counterbore 547 of block 457. Threaded at 548 in tube bore 549 is bushing 550, which is held from outward displacement by end wall 551 of casing 467. The bushing has a conical counterbore 552 which acts, at times, as a positive stop to be engaged by complementary nose 553 on core 497. Threaded into the bore of bushing 550 from the outside of wall 551, is hollow screw 554 having a bore 555, this screw serving, through bushing 550 in its connection with member 464, to hold casing 467 and member 464 with all the elements enclosed therebetween, in detachable assembly.

Plunger portion 497 comprises the core or movable armature or solenoid 465. The core is bored and counterbored at 556 and 557, respectively, a guide pin 558 being press-fitted in bore 556 and its free end being guided in screw-bore 555. Spring 531 encircles pin 558 within counterbore 557 and is interposed between the end of screw 554 and the bottom wall of the counterbore, thus serving normally and yieldingly to hold plunger 488 and all switch-parts carried thereby in the positions of Fig. 26.

Plunger 488 is drawn, against the force of spring 531, from the position of Fig. 26 to that of Fig. 27 by energization of solenoid coil 559 and its consequent magnetic action on core 497—the final abutment of nose 553 with shoulder 552 positively limiting such plunger movement.

Coil 559 is insulated at 560 from casing 467 and tube 545, while one of its ends is insulated by washer 561. A thick, coil-insulating ring 562 is grooved at 563 (Figs. 27 and 28) the open face of the groove being closed by insulating washer 563'. Extending through insulating bushings 564 in wall 551 and through ring 562 below groove 563, are terminals 565 and 566, the terminals having respective heads 567 and 568 (Fig. 28) which lie within said grooves and are cut arcuately at 569 to the curvature thereof in order to prevent terminal-rotation. Wires 570 and 571 lead from heads 567 and 569, respectively, through insulating washer 563 to the opposite ends of coil 559.

The outer extremities of terminals 565 and 566 form binding posts 572 and 573, respectively, and wires, later to be designated, run from these posts to switch 240 of primer D, the circuiting being such that when switch 240 is closed, solenoid 465 is energized to shift plunger 488 and its switch elements, as has been described. Upon breaking the circuit to solenoid 465 through the opening of switch 240, spring 531 restores all the parts of control switch H to the positions of Fig. 26.

The parts the various control switch elements play in the operation of the recharger will later be described in connection with the circuit designations.

Circuit breaker J (Figs. 35 to 39, inclusive) is used, either automatically or manually, to interrupt the various circuits under certain conditions to be mentioned later. It includes insulation block 576 of rectangular cross section throughout the major portion of its extent, and having a relatively wide portion 577 and a relatively narrow portion 578, the wider portion fitting snugly between plates 434 and 435 and being secured to plate 434 at 579. Block 576 has axial bores 580 and 581 which open into a central, rectangular through-passageway 582. Secured to block 576 by screws 583 against passageway walls 584 and 585 at opposite sides of bore 581, are two contacts 586 and 587. Binding posts 588 and 589 for contacts 586 and 587 respectively, also serve as contact-positioning elements.

Contacts 586 and 587 are spaced apart as clearly shown in Fig. 37 and are provided with half-bores 590 of such radius that it is assured the contacts will clear the plunger mechanism to be described.

The plunger generally indicated at 591 has a rod portion 592 which is integral with an enlarged core or armature portion 593, there being an intermediate step 594 between these portions. An insulating washer 595 defines, with plunger shoulder 596, a groove 597, the washer being held in position by insulating bushing 598 which is flanged at 599. A second and larger insulation washer 600 is interposed between bushing 598 and the end of sleeve 601, said sleeve being threaded on rod 592 at 602 and serving to maintain washers 595, 600 and bushing 598 in assembly. Rod 592 may be headed over at 603 to hold this assembly more or less permanently intact. Rod 592 and sleeve 601 extend through face plate 451 to the exterior of control box 390, sleeve 601 carrying the knob 604 whereby the plunger may be reciprocated manually under certain conditions. It will be noted that box-end 433 is cut away at 433' (Fig. 35) to allow block 576 to engage the inner face of plate 451.

Slidably mounted on insulating bushing 598 is disk blade 605 which is normally urged toward washer 600 by spring 606 interposed between that blade and flange 599.

When breaker J is in the normal or closed condition of Fig. 36, plunger 591 will be drawn to the right and blade 605 will engage contacts 586 and 587, thus closing switch 607 which may be considered as made up of those contacts and that blade. The wiring to contacts 586 and 587 will be established later. At such times as switch 607 is closed, plunger 591 will be sufficiently to the right to have cleared washer 600 from blade 605, but spring 580 compensates for the over-throw of the plunger and yieldably maintains the blade against the contacts.

I provide solenoid 608 for accomplishing the automatic opening of switch 607—that is, for changing breaker J from the condition of Fig. 36 to that of Fig. 35. This solenoid is made up of substantially cylindrical, cup-shaped casing 609, flattened at 610 (Fig. 39) to fit snugly between plates 434 and 435, and being secured to plate 434 at 611.

Solenoid member 612 consists of tube portion 613 and flange 614, the latter being attached at 615 to the flanged portion 617 of block 572. The bore 618 of tube 613 forms a guideway for core 593 of plunger 591. Solenoid coil 619 lies in the annular space defined by tube 618 and casing 609, being insulated therefrom at 620. Washer 621 and insulating washer 622 space one end of the coil from flange 614, while a thick insulating washer 623, annularly grooved at 624 (Fig. 39) lies between the other end of the coil and bottom 625 of cup-member 609, insulating washer 626 overlying groove 624.

Terminal posts 627 and 628 have heads 629 and 630, respectively, which lie within groove 624 and are arcuately cut at 631 to fit the curvature of said groove and thus prevent terminal-rotation. The shanks of posts 627 and 628 extend through ring 623 and thence through insulating bushings 632 to the exterior to the housing of the casing 609, nuts 633 serving as wire-clamps whereby the posts are put in the circuit to be later described. Heads 629 and 630 carry wires 634 and 635, respectively, which pass through insulating washer 626 and are connected to the opposite ends of coil 619.

Threaded within the bore 618 of tube 613 is a bushing 636, screw 637 extending from casing-end 625 into that bushing and thus holding all the solenoid elements detachably in assembly. The inner end of bushing 636 has a conical face 638 adapted to be engaged by conical nose 639 on core 593 to provide a positive stop for leftwise movement (Fig. 35) of said core and therefore of plunger 591 as the latter is moved under the impulse of coil 619. The plunger is shown in full lines in Fig. 35 as occupying this fully retracted position.

As will appear, solenoid 608 is energized upon such occasions as call for the breaking of the recharger-control circuit, such breaking being accomplished by the opening of switch 607 upon leftwise movement of plunger 591 from the position of Fig. 36 to that of Fig. 35. Then, even though the solenoid be subsequently deenergized, switch 607 remains open. Upon overcoming the causes which lead to the opening of the circuit breaker, switch 607 is reclosed by manually pulling knob 604 which will restore the breaker to the condition of Fig. 36, and, of course, it is possible manually to open that switch by thrusting in on knob 604.

A snap actuator is indicated generally at 645, being provided for releasably holding plunger 591 in either of its extreme positions. The actuator includes a rock shaft 646 extending through bushings 647 inserted in the transverse bore 648 of block-portion 578. Centrally mounted on opposite ends of shaft 646 are levers 649 carrying cam pins 650 which extend through block slots 651 (Fig. 38) into plunger-groove 597. The opposite ends of levers 649 carry studs 652 which take the upper ends of extension springs 653. The lower ends of said springs are applied to studs 654 provided on the opposite ends of pin 655 which extends transversely through block-portion 578 at a point directly beneath rock shaft 646.

The snap-actuator elements are so relatively located that when switch 607 is closed (Fig. 36) springs 653 tend to rotate levers 649 in a counter-clockwise direction, said levers thus acting through pins 650 to hold plunger 591 in the position of that figure.

When plunger 591 is moved toward the left (either by thrusting on knob 604 or by reason of solenoid energization) washer 600 engages blade 605 to open switch 607, and the plunger acts through pins 650 to rotate levers 649 in a clockwise direction as viewed in Fig. 36. As pins 650 and studs 652 pass through the line of centers of shaft 646 and fixed studs 654 (Fig. 38 shows the position of the various parts when all centers are in vertical alignment) springs 653 act suddenly to give added clockwise impetus to levers 649 and thereafter serve releasably to hold said levers against counter-clockwise movement, thereby releasably holding the plunger in a position to maintain switch 607 open (Fig. 35).

Upon subsequently manually moving plunger 591 from the position of Fig. 35 to that of Fig. 36, levers 649 are rotated by pins 650 in a counter-clockwise direction, and as soon as studs 652 and said pins pass through the aforementioned line of centers, springs 653 act through levers 649 and pins 650 to snap switch 607 closed.

In order that there may be visual indication of the condition of switch 607, I mount an indicator disk 660 on shaft 661 which extends across block-groove 662. The disk has on its peripheral face an indicating button 663, while extending radially from that face is a radial lug 664 entered in plunger-groove 665, whereby plunger reciprocation is adapted to oscillate the disk. When switch 607 is closed (Fig. 36) disk 660 will be in a position to expose button 663 through window 666 in face-plate 451, but when the switch is open (Fig. 35) the disk will have been rotated to a position where button 663 is out of sight.

Solenoid 608 is energized, in a manner to open switch 607, by virtue of critical circuit conditions as they affect the thermostatic switch K, said thermostatic switch being in circuit with the solenoid through wiring later to be designated. Switch K includes a base block 667 fastened to plate 434 at 668 (Figs. 20, 24 and 25) and upon which are supported terminals 669 and 670. Terminals 669 and 670 are connected at 671 and 672, respectively, to binding posts 673 and 674. Terminal 669 consists of a post 675 to which a contact head 676 is attached through its threaded shank 678, the screw-threaded connection allowing head 676 to be adjusted toward or away from contact 679 on switch blade 680, said blade being supported on and electrically connected to terminal 670.

Switch blade 680 is bi-metallic, that is, it is made up of two metal strips 681 and 682 which have differential co-efficients of expansion so, upon occurrence of temperature changes within certain limits, the blade, as a whole, flexes. A U-shaped dielectric strap 683 is clamped about blade 680 by bolt 684, an insulating spacer 685' being positioned about the screw and between the upper ends of the legs of strip 683. Bolt 684 also serves to connect conductor strip 685, which extends from binding post 673' on base 667, to one end of resistance coil 686, the coil being wrapped around dielectric 683 and having its opposite end electrically connected to blade 680 at 687.

Under normal conditions, switch K remains open, that is, head 676 and contact 679 are spaced apart, but should there be conditions within the circuit (completed through blade 680, coil 686 and strip 685) which will cause coil 686 to heat up to a degree bringing contact 679 into engagement with head 676, switch K is closed and will cause, through a circuit to be described, energization of breaker solenoid 608 and a consequent opening of circuit-breaker-switch 607. Upon subsequent cooling of coil 686, blade 680 will spring back to separate contact 679 from head 676 and thus open switch K—though the breaker is manually restored to its operative or closed condition only after correction of the conditions which originally caused the overheating of coil 686.

In the diagram of Fig. 40, the wire-designations will be applied to the elements in wing T, but the duplicates of those elements and of the wires in wing S will be given the same numbers plus the letter "a". For simplicity, such elements as conductor bars 264, 324, 406 and 407, as well as certain terminal-elements, are indicated in the diagram as wires, and in describing the circuits they will sometimes be so considered. The contacts of switch H are represented as though viewed from the position of arrow 4 in Fig. 30.

In cockpit U are carried battery 688, master switch L, trigger switch M, and selector switch N; the "ground" of the system being indicated at Y. All wires leading eventually to "ground" will be designated as "y", so in describing the circuits it will be unnecessary to follow the particular course followed in passing from any instrument to final "ground", but it will suffice merely to specify that it goes to ground Y. Wires 689 lead from battery 688 to trigger-switch M (master switch L, adapted to interrupt this main feed-line, being considered for the present purposes as always closed) while wire 690 leads to the three contacts 691, 692 and 693 of selector switch N, said switch being represented diagrammatically as including a rotary blade-carrier 694 having blades 695, 696 and 697. Main feed wire 698 of the control system for the right-wing gun and recharger, leads from contacts 699 and 700 of switch N, while the equivalent wire 698a for the left-wing gun and control system leads from contacts 701 and 702 of switch N.

With switch N in the condition of Fig. 40, it will be seen that connection is made from wire 690 to wire 698 through contact 693, arms 695 and 697, and contact 699, while connection is made from wire 690 to wire 698a through contact 693, arms 695 and 696, and contact 701. It follows that when trigger-switch M is closed, the recharger control circuits of both the right and left-wing gun systems are put in circuit with the battery, and, as will appear, both guns 10 and 10a are fired.

If blade carrier 694 be rotated to bring arm 696 into engagement with contact 702, arm 695 will engage 692 but arm 697 will lie between contacts 699 and 700, it following that only the left-wing gun and recharger are put in action upon closing switch M. If carrier 694 be rotated to engage arm 697 with contact 700, arm 695 will engage contact 691, but arm 696 will lie beyond both contacts 701 and 702, it following that only the right-wing gun and recharger will be put in action by closing trigger switch M.

In the following discussion it will be assumed that switch N is in the condition of Fig. 40. Only the right-wing circuits will be discussed in detail, but it will be understood that the closing of trigger switch M will simultaneously accomplish everything in connection with the left-wing circuits that it accomplishes in connection with the right-wing circuits.

There are two main circuits involved in the system—the firing circuit and the recharger circuit. The firing circuit is as follows: battery 688, switches L, M and N, wire 698, terminal 443 (Fig. 20), wire 486, firing-circuit switch 494 (Figs. 26, 30, and 31), wire 704 (Fig. 20), terminal 437, wire 705 (Fig. 20), trigger solenoid 35 (Fig. 2), y to terminal 441 (Fig. 20), ground Y.

Thus, when trigger switch M is closed, solenoid 35 is energized and gun 10 is fired, as has previously been described, bolt 28 reciprocating to clear and reload the chamber repeatedly during the firing of the burst and as long as the trigger switch is held closed—assuming there are no defective cartridges encountered and that the supply of ammunition is not exhausted.

The recharger circuit may be considered as made up of several inter-related sub-circuits and, as shown, certain switch-elements and wires are common to several or all these sub-circuits—this being done in the interests of space and element economy, but it is not, of course, limitative on the invention. For the same reason, some of wires and elements of the sub-circuits are common with the wires and elements of the firing circuit, above. The sub-circuits are as follows—(1) a circuit whereby the priming switch D is actuated toward closed position—which circuit will hereinafter be referred to as the "primer-actuator" circuit; (2) a motor-switch circuit which is controlled by the priming switch; and which, in turn, controls (3) the motor circuit whereby motor E is energized; (4) a trigger by-pass circuit; and (5) a signal circuit. The motor circuit also includes a line running to and actuating the motor-brake release G.

Trigger-switch M directly controls the primer actuating circuit, said switch closing that circuit simultaneously with the closing of the firing circuit, thus immediately putting the priming switch in readiness for instant action in case of "stoppage" in gun-action.

The primer-actuating circuit is as follows: battery 688, switches L, M and N, wire 698, terminal 443, wire 703, wire 486, feed switch 492 (Figs. 26, 30 and 31), wire 706 (Fig. 37), breaker switch 607 (Fig. 35), wire 707 (Fig. 37), wire 708, terminal 439 (Fig. 20), wire 709, terminal 218 (Fig. 5), wire 710, terminal 279 (Fig. 14), wire 264 (Fig. 15), terminal 265, terminal 316, coil 301 of priming-switch actuator (Fig. 17), y, terminal 323, wire 324, terminal 281 (Fig. 15), y to terminal 208 (Fig. 5), y to contact 441 (Fig. 20), y to ground Y.

Thus, when trigger switch M is closed, coil 301 of solenoid 300 (Fig. 17) is energized thus tending to close switch 240 of priming unit D (Fig. 17) but, as has been explained, since the firing circuit is closed and the gun firing stud 45 in its reciprocation prevents said switch 240 from closing so long as the gun continues to fire.

If there is no live cartridge in gun-chamber 21 when the firing circuit is first closed, or if a defective shell or an empty ammunition belt interrupts a burst, stud 45 comes to rest and solenoid 300 closes switch 240 and projects nose-piece 380 into the extended position of Fig. 18, as has been described. This closes the motor-switch circuit, which is represented as follows: From battery 688 the circuit follows the course indicated above for the primer-actuator circuit up to and including terminal 279, then continuing through—terminal 279, wire 262 (Fig. 14), switch 240 (Fig. 18), wire 263, terminal 280 (Figs. 14 and 15), wire 712, terminal 217 (Figs. 6 and 7), wire 713, terminal 440 (Fig. 20), wire 714, wire 715, solenoid 465 of control switch H (Figs. 26 and 27), y to terminal 441, y to ground Y.

It will be noted that wire 714 of the above circuit also connects with wire 716 which leads to contacts 674 and 670 of thermostatic switch K (Figs. 24 and 25). One branch of this lead is normally open between blade terminal 679 and contact 676, but the other branch leads through resistance coil 686 to terminal 673' whence it follows y to terminal 441 and thence to ground Y.

The closing of the above identified motor-switch circuit, energizes coil 559 of control switch H and moves plunger 488 (Fig. 26) to the left and through the several successive positions previously described (Figs. 31 through 33).

In the first critical position to which it is moved (Fig. 32), switch 494 (of the firing circuit) is opened and switch 493 is closed—switch 492 remaining closed and switch 495 remaining open.

It will be seen, however, that disk 491 will have been cleared from contacts 474 and 475 before blade 480 engages contacts 472 and 473, it following that switch 494 and hence the firing circuit are opened before switch 493 is closed.

The opening of switch 494 opens the firing circuit and thus eliminates any drain on the battery by trigger-solenoid 35 during the immediately following actuation of motor E, a feature of obvious advantage. While it is true that this renders the trigger solenoid ineffective, it is of no consequence, for the gun is not in a condition to fire until the recharger has completed its work; and the firing circuit is reclosed (assuming the trigger switch M remains closed) by a reclosing of switch 494 just prior to the time the recharger finishes its reloading operation. Thus, no useful firing-time is lost by the opening and reclosing of the firing circuit.

Since, in this position of the control switch (Fig. 32) switch 492 has been held from opening by detents 532, the primer-actuating and motor-switch actuating circuits remain closed and continue to function as above described.

However, the closing of switch 493 closes the trigger-by-pass circuit, said circuit by-passing not only the trigger switch M but also selector switch N. It is tapped into line 689 between the battery and the trigger switch, and is designated as follows: Battery 688, wire 689 and switch L, wire 717, terminal 442 (Fig. 20), wire 718, trigger by-pass switch 493 (Figs. 26, 30 and 31), wire 487, wire 706 and thence runs to ground Y through both the primer-actuating and motor-switch circuits as previously described from this point (wire 706) on.

By reason of the closing of this trigger by-pass circuit, switch 493 is put in condition to take over the duties of switch 492 when the latter is opened by the immediately following further progression of plunger 488 to the position of Fig. 33. The significance of this will be later explained.

With plunger 488 of control switch H in its fully retracted position of Figs. 27 and 33, switch 493 remains closed, having already assumed, without circuit-interruption, the duties of switch 492, which is now open; firing circuit switch 494 remains open; and motor-switch 495 is closed.

The closing of switch 495 closes the motor circuit, which may be identified as follows, remembering that trigger- by-pass switch 493 is in effect. Battery 688, wires 689 and 717 through the above identified trigger by-pass circuit through wire 707 and thence through—motor-switch 495 (Figs. 26, 30 and 31), wire 719 (Fig. 20), terminal 438, wire 720, terminal 209 (Figs. 5 and 6), wire 721, motor E (Fig. 5), y to 208, y to terminal 441, y to ground Y.

The closing of switch 495 also closes the brake-release circuit which is tapped from—wire 721, above, and thence runs through—wire 213, solenoid 202 of brake-release G, 212 to y and thence to ground Y.

The closing of the brake-release circuit frees the motor for rotation while the simultaneous closing of the motor circuit puts motor E into operation, whereupon it acts to drive retractor B in the manner previously described.

Now, since the trigger by-pass circuit is in effect, the recharger will continue to act until it has completed any one loading or reloading cycle which has been started, even though the trigger switch M is opened prior to the completion of that cycle, a feature of obvious advantage.

As stud 45 is driven by retracter B in a manner to retract the bolt 28, it finally reaches nose-piece 380 and acts thereupon to thrust plunger 285 back towards the position of Fig. 17. This serves to open switch 240 and thus serves to open the motor-switch circuit and thereby de-energizing 465 of control switch H. Thereupon, plunger 488 is moved by spring 531 from the position of Fig. 27 toward that of Fig. 26, the first critical extent of return movement opening motor switch 495 (Fig. 34) and thereby opening the motor-circuit and the motor-brake-release circuit, the motor thus coming to a stop under the action of brake F, as has been described. However, the motor coasts somewhat after its circuit has been broken and this overrun is effective to drive retractor chain 121 sufficiently to clear lug 133 from the path of stud 45 (Fig. 13) and to carry that lug around to the position of lug 134 in Fig. 12 and thus restore the chain drive to the position of Fig. 12 except that the lugs are in interchanged positions. Brake F is adjusted to limit the extent of motor "coast" or "over-run" so the desired conditions will prevail.

Bolt 28 and stud 45 are thus freed for movement towards chamber 21 under the impulse of driving spring 44, the bolt performing all its functions of normal counter-recoil movement.

Returning to consideration of the movement of control switch H towards the position of Fig. 26, at practically the same time as switch 495 opens, or shortly thereafter, by-pass switch 493 will open (Fig. 34) which opens the trigger-by-pass circuit and, since switch 492 is still open, no current can flow through the primer-actuator circuit and consequently solenoid 300 is de-energized, so spring 341 acts to hold plunger 285 in the position of Fig. 17 and thus maintains switch 240 (of the motor-switch circuit) open.

Upon full return of control switch H to the position of Figs. 26 and 31, switch 494 closes to restore the firing circuit to closed condition and switch 492 closes to effect a reclosing of the primer-actuating circuit and consequent re-energization of solenoid 300; and the entire system is thus put in "stand-by" condition to repeat the entire cycle described above.

Then, if trigger switch M is still closed, the firing will recommence, with stud 45, in its reciprocation, acting to hold priming switch 240 from closing unless the gun again fails to fire.

In the event of stoppage and consequent recharger-actuation, it may happen that the first re-load fails to fire. Thereupon the recharger instantly goes into action again. If a consecutive series of defective cartridges is encountered or if the ammunition belt becomes emptied (meaning, in either case, that there is no recoil force available to cock the gun) the recharger will remain in continuous operation. However, it is preferred to provide means preventing unduly long continuous operation. For instance, the means I provide will cut-out the recharger system after it has completed four or five continuous cycles—which consumes five or six seconds.

This means comprises the circuit-breaker J and thermostatic switch K described above. Such continuous operation of the recharger or any jam of the gun or recharger, will result in the heating of resistance coil 686 (Figs. 20, 24 and 25) to an extent which will flex blade 680 into engagement with contact 676. Thereupon current will flow from wire 716 through contact 670, blade 680, contact 676, wire 722, terminal 628 (Figs. 35 and 39), solenoid coil 608, terminal 627, and y to ground Y.

This energizes solenoid 608 and plunger 581 is drawn from the position of Fig. 36 to that of Fig. 35, opening switch 607 and thus opening all leads from wire 706. The recharger system is thus thrown out of operation until the cause of stoppage has been rectified, whereupon the circuit breaker J is restored to the condition of Fig. 36 by manually pulling knob 604. The circuit-breaker does not, however, affect the firing circuit.

In connection with control switch H (Figs. 26 and 27) it is to be noted that if chamber 21 is empty, it may be loaded by manually thrusting on handle 530, the loading being accomplished by actuation of the recharger without closing trigger switch M. For, when plunger 488 is thus thrust to the position of Fig. 27, switches 492, 493, 494 and 495 are all put in the same condition (and sequentially, in the same order as though solenoid 465 had been energized by the closing of the priming switch, and the motor E is energized through the trigger by-pass circuit in a manner to operate retracter B. But the firing circuit will remain open both at switch M and at switch 494, so there will be no firing of the gun after it is reloaded. This provision obviates the chance of firing the first few cartridges, which might otherwise occur if the loading were effected by closing trigger switch M, for the closing of that switch to put the recharger into operation also actuates trigger solenoid 35, and a gunner could hardly release the trigger before at least one cartridge was fired after the gun had been reloaded.

The opening of switch 494 before the closing of switch 493 (as described in connection with the magnetic operation of the plunger but likewise inherent to the operation when the plunger is manually actuated) prevents a firing which otherwise might occur by reason of current-flow through wires 717 and 718, switch 493, wire 487, reversely through switch 492 (since it would be in the closed condition of Fig. 32 for an instant) wire 486, switch 494, wires 704 and 705, trigger solenoid and ground.

The manual actuation of plunger 488, as above, is accomplished, of course, before the equipped air-plane takes off, and relieves the gunner of the necessity of reloading in flight prior to the time he actually wishes to fire the gun. Of course, if he prefers, he may wait until he wishes to put the gun in action and accomplish the reloading by closing the trigger switch M whereupon he gets a reloading instantly followed by the firing of a burst.

Assuming both guns are in circuit with trigger switch M through selector switch N, it will be seen that the primer actuating circuit to both guns will be closed as soon as switch M is closed. Therefore the recharger circuits to both guns are in instant readiness to respond in the event of stoppage. Now assume that the right-gun cease firing by reason of a defective cartridge, and the right-gun recharger therefore goes into action to accomplish a reload as has been described above. This, of course, does not put the left-gun recharger into operation, for its motor-switch circuit is held open by the reciprocation of bolt-stud 45a, but its primer actuator circuit would be closed.

However, if the trigger switch be opened prior to the completion of the right-gun recharger cycle, control switch H of the right-gun circuit remains closed until completion of the cycle, as has been described. Consequently, during this completion period, with the trigger switch open, current is flowing through the trigger-by-pass circuit of the right-gun system. If now, as the cycle is completed, and if switch 492 were closed prior to the opening of switch 493, current could flow from battery 688 through wire 717, terminal 442, wire 718, switch 493, wire 487, switch 492 (in a direction reverse to the normal current-flow through that switch), wire 486, wire 703, terminal 443, wire 698, selector switch N, contact 701, wire 698a and thence through wire 486a and closed switch 494a, through the firing circuit of the left-gun.

This would start the left-gun firing just as though the trigger switch M had been reclosed. Also the current from wire 486a would flow through switch 492a and thence through the left-gun circuits which are normally closed by that switch, resulting in a useless consumption of electricity. These conditions, however, are obviated by opening switch 492 the instant after switch 493 is closed and then preventing switch 492 from re-closing until switch 493 is re-opened, as has been described in connection with the description of the operation of control switch H.

It is preferable that visual means be provided for advising the gunner of the condition of the control circuit, and for this purpose I provide a signal lamp 725 in cockpit U. The circuit for this lamp is tapped by wire 726 into the motor-switch circuit at terminal 440. When switch 240 closes by reason of bolt 28 coming to rest while the trigger switch still remains closed, the circuit to signal lamp 725 is closed through the motor-switch circuit and wire 726 and the lamp is thus lighted.

However, immediately bolt 28 is fully retracted by operation of retracter B and switch 240 is thus opened, the signal lamp will be extinguished. Thus a single flash of the lamp indicates the recharger has gone into operation and has completed its task.

If a continuous series of defective cartridges is encountered, the recharger will, of course, continuously repeat its cycles (up to the time breaker J opens) causing consecutive closings and openings of switch 240 and there will thus be a series of lamp-flashes corresponding to the number of recharger actuations.

If, during the period of a starter actuation, the gun jams or the recharger mechanism stalls, the bolt stud 45 will not re-open switch 240 and hence lamp 725 will remain steadily illuminated until thermostatic switch K opens circuit-breaker J, whereupon the main control circuit is opened and the signal light will be extinguished.

Fig. 41 shows diagrammatically a variational embodiment wherein a single gun is fired directly by a mechanical trigger and wherein the priming switch acts directly to close the motor circuit. There is thus allowed a decided simplification in circuiting and switch mechanism, but I will apply the same reference characters plus the letter "b" to so much of the showing as is common to the two systems. The foregoing description will therefore apply to the common subject matter. The showing is further simplified by showing separate grounds Ya for the individual circuits.

Here, the trigger 727 comprises a pivoted lever 728' which is adapted to be depressed manually to release sear 31b and thus fire gun 10b. When the trigger is thus depressed it closes switch 728 and thereby closes the primer-actuating circuit, as follows: battery 688b, master switch Lb, wire 729, switch 728, wire 730, feed switch 492b, wire 731, circuit-breaker switch 607b, wire 732, wire 733, primer-actuator solenoid 300b, ground Y.

This energizes solenoid 300b and tends to close motor switch 240b—the unit Db being exactly the same and actuating in exactly the same manner as the delay or priming switch unit D, except that it is here used as a directly acting motor-switch instead of a relay to control a circuit which acts on a final motor-switch.

As long as the gun fires properly, stud 45b acts as previously described to hold switch 240b open, but if, with trigger 727 depressed, a cartridge fails to fire, stud 45b comes to rest and switch 240b is closed. This closes the motor circuit as follows: the primer-actuating circuit, above, from battery 688b up to—wire 732, and then, wire 734, switch 240, wire 735, wire 736, motor Eb, ground Y.

At the same time, motor-brake release solenoid 202b is energized through wire 737 and 738. Accordingly the motor brake is released and the motor is put in operation to actuate recharger Bb, as has been described.

At the same time as the motor circuit is thus closed, the actuating solenoid 465b of switch Hb is closed through the following circuit: battery 688b through the motor circuit just described to wire 738 and then wire 739, wire 740, solenoid 465b, y to ground Y.

This energizes solenoid 465b and acts to close trigger by-pass switch 493b before switch 492b is opened (or, in this case, switch 492b may remain closed at all times since there is no complication of multiple-gun circuiting) solenoid 300b being thus kept energized to hold switch 240b closed, and the motor circuit being now fed from battery 688b through wire 741 and switch 493b instead of through wire 729, switch 728, wire 730 and switch 492b.

By reason of this by-passing of the trigger-closed circuit, the retractor Bb is enabled to complete its cycle even though trigger 727 is released to open switch 728 before that cycle is complete.

When the retracted stud 45b opens switch 240b, the motor circuit, the brake-release circuit, and the circuit to solenoid 465b are opened, thus bringing the retracter to rest, and freeing control switch Hb for return to the condition of Fig. 41, but, if the trigger 727 is still depressed, solenoid 300b will be energized, so the system is in condition to repeat the recharging cycle immediately upon stud 45b coming to rest.

In Fig. 42 I have shown schematically a variation in which stud 45c on bolt 28c is used to take its retractive drive from the retractor Bc but instead of utilizing this stud for operating nose-piece 380c, of primer unit Dc, I provide a separate tappet 45d, applied to bolt 28c for this purpose.

While I have shown and described preferred embodiments of my invention, it will be understood various changes in design, structure, arrangement and circuiting may be made without departing from the spirit and scope of the appended claims.

I claim:

1. In combination with a machine gun having a reciprocatory bolt normally adapted to be retracted by recoil forces of a fired cartridge for automatically reloading the gun-chamber; an electric circuit, a switch in and adapted partially to control said circuit, said switch being adapted to be closed by depression of the gun-trigger, an electrically operated retracting mechanism in said circuit and adapted to act automatically to retract the bolt and then free it for counter-movement when the gun fails to fire while the gun-trigger is depressed, and adapted to continue in action for at least a given number of cycles to repeatedly retract and free the bolt so long as the gun fails to fire while the trigger is held depressed, and a switch in said circuit which opens automatically and thereby acts to halt operation of the mechanism after it has completed a predetermined numer of continuously repeated cycles even though the trigger remains depressed and is holding the first mentioned switch closed.

2. In combination with a machine gun having a reciprocatory bolt normally adapted to be retracted by recoil forces of a fired cartridge for automatically reloading the gun-chamber; an electric circuit, a switch in and adapted partially to control said circuit, said switch being adapted to be closed by depression of the gun-trigger, an electrically operated retracting mechanism in said circuit and adapted to act automatically to retract the bolt and then free it for counter-movement when the gun fails to fire while the gun-trigger is depressed, and adapted to continue in action for at least a given number of cycles to repeatedly retract and free the bolt so long as the gun fails to fire while the trigger is held depressed, and a switch in said circuit which opens automatically and thereby acts to halt operation of the mechanism after it has been in continuous operation for a predetermined length of time even though the trigger remains depressed and is holding the first mentioned switch closed.

3. In combination with a machine gun having a reciprocatory bolt normally adapted to be retracted by recoil forces of a fired cartridge for automatically reloading the gun-chamber; auxiliary mechanism for retracting the bolt and then freeing it for counter-movement, said mechanism embodying a chain supported adjacent the bolt and having a portion of its course paralleling the retractive path of the bolt, a lug on the chain, and means for driving the chain in a direction to engage the lug with the bolt, then to drive the bolt ahead of the lug to its position of full retraction, and then to clear the lug from engagement with the bolt.

4. In combination with a machine gun having a reciprocatory bolt normally adapted to be retracted by recoil forces of a fired cartridge for automatically reloading the gun-chamber; auxiliary mechanism for retracting the bolt and then freeing it for counter-movement, said mechanism embodying a chain supported adjacent the bolt and having a portion of its course paralleling the retractive path of the bolt, a plurality of spaced lugs on the chain, and means for driving the chain in a direction to engage one of the lugs with the bolt, then to drive the bolt ahead of said one lug to its position of full retraction, and then to clear said one lug from engagement with the bolt, such chain-movement moving another lug into the position to engage the bolt upon subsequent chain-movement, only one of said lugs being movable into the bolt-path at a given time.

5. In combination with a machine gun having a reciprocatory bolt normally adapted to be retracted by recoil forces of a fired cartridge for automatically reloading the gun-chamber; auxiliary mechanism for retracting the bolt and then freeing it for counter-movement, said mechanism embodying a chain adjustably supported adjacent the bolt and having a portion of its course paralleling the retractive path of the bolt, a lug on the chain, and means for driving the chain in a direction to engage the lug with the bolt, then to drive the bolt ahead of the lug to its position of full retraction, and then to clear the lug from engagement with the bolt; and means for bodily shifting said chain in the directions of bolt-movement.

6. In combination with a machine gun adapted to be fired by the closing of a firing circuit including a trigger switch and a firing motor or the like, and having a reciprocatory bolt normally adapted to be retracted by recoil forces of a fired cartridge for automatically reloading the gun-chamber; electrically operated retracting mechanism applied to the gun for retracting the bolt and then freeing it for counter-movement, said mechanism being initially under control of the trigger switch but being adapted to complete any cycle, once started, irrespective of the condition of the firing circuit.

7. In a device adapted to be applied to a machine gun for retracting the bolt thereof and then freeing it for counter-movement, a driveable retracter unit having a member operatively engageable with the bolt for so actuating it, an electric motor operatively connected to the unit to drive it, a motor circuit, a switch for closing and reopening the circuit, and switch means acting automatically from the time said first mentioned switch is closed to keep said motor circuit closed until said retracter has completed its initiated cycle of operation.

8. In a device adapted to be applied to a machine gun for retracting the bolt thereof and then freeing it for counter-movement, a driveable retracter unit having a member operatively engageable with the bolt for so actuating it, an electric motor operatively connected to the unit to drive it, a motor circuit, a switch for closing and reopening the circuit and controlled by the bolt; and a motor-brake acting automatically upon the reopening of the circuit to check motor-rotation.

9. In a device adapted to be applied to a machine gun for retracting the bolt thereof and then freeing it for counter-movement, a driveable retracter unit having a member operatively engageable with the bolt for so actuating it, an electric motor operatively connected to the unit to drive it, a motor circuit, a switch for closing and reopening the circuit and controlled by the bolt, and a brake selectively effective on the reopening of the circuit to check the operation of the retracter.

10. In a device adapted to be applied to a trigger-controlled machine gun for retracting the bolt thereof and then freeing it for counter-movement, a driveable retracter unit having a member operatively engageable with the bolt to so actuate it, an electric motor operatively connected to the unit to drive it, a motor circuit, and a normally open switch in said circuit movable from open towards closed condition by virtue of and immediately upon depression of the trigger.

11. In a device adapted to be applied to a trigger-controlled machine gun for retracting the bolt thereof and then freeing it for counter-movement, a driveable retracter unit having a member operatively engageable with the bolt to so actuate it, an electric motor operatively connected to the unit to drive it, a motor circuit, a normally open switch in said circuit movable from open towards closed condition by virtue of and immediately upon depression of the trigger, and switch means acting immediately and automatically upon the closing of said first mentioned switch to keep said circuit closed until said retracter has completed its initiated cycle even though the trigger is released in the meantime.

12. In a device adapted to be applied to a machine gun, which gun is fired by the closing of a trigger switch in the firing circuit, for retracting the bolt thereof and then freeing it for counter-movement, a driveable retracter unit having a member operatively engageable with the bolt for so actuating it, an electric motor operatively connected to the unit to drive it, a motor circuit, and a normally open switch in said motor circuit movable from open towards closed condition by virtue of and immediately upon the closing of the trigger switch.

13. In a device adapted to be applied to a machine gun, which gun is fired by the closing of a trigger switch in the firing circuit, for retracting the bolt thereof and then freeing it for counter-movement, a driveable retracter unit having a member operatively engageable with the bolt for so actuating it, an electric motor operatively connected to the unit to drive it, a motor circuit, a normally open switch in said circuit movable from open towards closed condition by virtue of and immediately upon the closing of the trigger switch, and switch means acting immediately and automatically upon the closing of said first mentioned switch to keep said motor circuit closed until said retracter has completed its initiated cycle even though the firing circuit is opened in the meantime.

14. In a device adapted to be applied to a machine gun, which gun is fired by the closing of a trigger switch in the firing circuit, for retracting the bolt thereof and then freeing it for counter-movement, a driveable retracter unit having a member operatively engageable with the bolt for so actuating it, an electric motor operatively connected to the unit to drive it, a motor circuit, and a normally open switch in said circuit movable from open towards closed condition by virtue of the closing of the trigger switch, means acting automatically to open said firing circuit approximately at the time the motor circuit switch is closed, and switch means acting automatically to keep said motor circuit closed until said retracter has completed its initiated cycle even though the firing circuit is opened in the meantime.

15. In a device adapted to be applied to a machine gun, which gun is fired by the closing of a trigger switch in the firing circuit, for retracting the bolt thereof and then freeing it for counter-movement, a driveable retracter unit having a member operatively engageable with the bolt for so actuating it, an electric motor operatively connected to the unit to drive it, a motor circuit, a normally open switch in said circuit movable from open towards closed condition by virtue of the closing of the trigger switch, means acting automatically to open said firing circuit approximately at the time the motor circuit switch is closed, and switch means acting automatically to keep said motor circuit closed until said retracter has completed its initiated cycle even though the firing circuit is opened in the meantime; and means subsequently reclosing said firing circuit prior to the completion of said initiated cycle.

16. In a device adapted to be applied to a machine gun, which gun is fired by the closing of a trigger switch in the firing circuit, for retracting the bolt thereof and then freeing it for counter-movement, a driveable retracter unit having a member operatively engageable with the bolt for so actuating it, an electric motor operatively connected to the unit to drive it, a motor circuit, a normally open switch in said circuit movable from open towards closed condition by virtue of the closing of the trigger switch, means acting automatically to open said firing circuit prior to the closing of the motor switch, and switch means acting automatically to keep said motor circuit closed until said retracter has completed its initiated cycle even though the firing circuit is opened in the meantime.

17. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a switch in said circuit, a spring normally tending to hold said switch open, selectively operable means adapted to move the switch towards closed position against the tendency of the holding spring, and a reciprocatory member connected to said switch and disposed in the reciprocatory path of said bolt in a manner whereby bolt-movement to a position of retraction engages the bolt with said reciprocatory member and thereby hold said switch open temporarily.

18. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, selectively operable electro-magnetic means tending to close said switch, and a reciprocatory member connected to said switch and disposed in the reciprocatory path of said bolt in a manner whereby bolt-movement to a position of retraction engages the bolt with said reciprocatory member and thereby holds said switch open temporarily.

19. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means adapted to be put into operation by depressing the gun trigger and thereby tending to close said switch, and a reciprocatory member connected to said switch and disposed in the reciprocatory path of said bolt in a manner whereby bolt-movement to a position of retraction engages the bolt with said reciprocatory member and thereby holds said switch open temporarily.

20. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, means yieldably resisting the closing movement of said switch, and a reciprocatory member connected to said switch and disposed in the reciprocatory path of said bolt in a manner whereby bolt-movement to a position of retraction engages the bolt with said reciprocatory member and thereby holds said switch open temporarily.

21. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, means yieldably resisting the closing movement of said switch, and a reciprocatory member connected to said switch and disposed in the reciprocatory path of said bolt in a manner whereby bolt-movement to a position of retraction engages the bolt with said reciprocatory member and thereby holds said switch open temporarily; said resisting means being timed to prevent said closing means from effectively closing said switch between successive engagements of the bolt with said member during normal firing of the gun.

22. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, means yieldably resisting the closing movement of said switch, and a reciprocatory member connected to said switch and disposed in the reciprocatory path of said bolt in a manner whereby bolt-movement to a position of retraction engages the bolt with said reciprocatory member and thereby holds said switch open temporarily; said resisting means being timed to prevent said closing means from effectively closing said switch between successive engagements of the bolt with said member during normal firing of the gun, and means for adjusting the timing of said resisting means.

23. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, means yieldably resisting the closing movement of said switch with decreasing effectiveness as the switch approaches closed position; and a reciprocatory member connected to said switch and disposed in the reciprocatory path of said bolt in a manner whereby bolt-movement to a position of retraction engages the bolt with said reciprocatory member and thereby holds said switch open temporarily.

24. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, means yieldably resisting the closing movement of said switch and being adapted suddenly to diminish its resistance as the switch reaches a point spaced a predetermined distance from its position of full-closure, and a reciprocatory member connected to said switch and disposed in the reciprocatory path of said bolt in a manner whereby bolt-movement to a position of retraction engages the bolt with said reciprocatory member and thereby holds said switch open temporarily.

25. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, said means embodying a reciprocatory plunger connected to said switch, a longitudinally telescoping joint in said plunger, means normally and yieldingly holding said joint extended, an electro-magnet adapted, upon energization, to move the plunger in a direction to close the switch; said plunger being disposed in the reciprocatory path of the bolt whereby bolt-movement to a position of retraction engages the bolt with the plunger and moves it in the opposite direction.

26. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, said means embodying a reciprocatory plunger connected to said switch, an electro-magnet adapted, upon energization, to move the plunger in a direction to close the switch, a dash-pot cylinder, and a dash-pot piston on said plunger and movable within the cylinder, whereby movement of the plunger in that direction is yieldably resisted; said plunger being disposed in the reciprocatory path of the bolt whereby bolt-movement to a position of retraction engages the bolt with the plunger and moves it in the opposite direction.

27. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, said means embodying a reciprocatory plunger connected to said switch, an electro-magnet adapted, upon energization, to move the plunger in a direction to close the switch, a dash-pot cylinder, and a dash-pot piston on said plunger movable within the cylinder to create a depression acting to resist movement of the plunger in that direction, means for suddenly relieving the depression when the plunger reaches a predetermined point in its movement in that direction; said plunger being disposed in the reciprocatory path of the bolt whereby bolt-movement to a position of retraction engages the bolt with the plunger and moves it in the opposite direction.

28. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a normally open switch in said circuit, means tending to close said switch, said means embodying a reciprocatory plunger connected to said switch, an electro-magnet adapted, upon energization, to move the plunger in a direction to close the switch, a magnet-energizing circuit, said circuit being controlled by movement of the gun trigger; said plunger being disposed in the reciprocatory path of the bolt whereby bolt-movement to a position of retraction engages the bolt with the plunger and moves it in the opposite direction.

29. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a motor switch in said circuit, a relay switch for controlling the motor switch through a relay circuit, means tending to close said relay switch; and a reciprocatory member connected to said relay switch and disposed in the reciprocatory path of said bolt whereby bolt-movement to a position of retraction engages the bolt with said reciprocatory member and thereby opens said relay switch.

30. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a motor switch in said circuit, a normally open relay switch for controlling the motor switch through a relay circuit, electro-magnetic means selectively energizable in a manner whereby it tends to close said relay switch; and a reciprocatory member connected to said relay switch and disposed in the reciprocatory path of said bolt whereby bolt-movement to a position of retraction engages the bolt with said reciprocatory member and thereby opens said relay switch.

31. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a motor switch in said circuit, a relay switch for controlling the motor switch through a normally open relay circuit, means adapted to be put into operation by depressing the gun-trigger and thereby tending to close said relay switch; and a reciprocatory member connected to said relay switch and disposed in the reciprocatory path of said bolt whereby bolt-movement to a position of retraction engages the bolt with said reciprocatory member and thereby holds said relay switch open temporarily, the closing of said relay switch also being effective to close a trigger by-pass circuit to the motor for continuing it in operation until the unit has completed the initiated cycle even though the trigger has been released in the meantime.

32. In a device adapted to be applied to a machine gun for retracting the reciprocatory bolt thereof and then freeing it for counter-movement, the gun being adapted to be fired by the closing of a firing circuit including a trigger switch and a firing motor or the like, a driveable retracter unit having a member engageable with the bolt for so actuating it, an electric motor operatively connected to the unit to drive it, a motor circuit, a motor switch in said circuit, a normally open relay switch for controlling the motor switch through a relay circuit, means adapted to be put in operation by closing the trigger switch and thereby tending to close said relay switch; and a reciprocatory member connected to said relay switch and disposed in the reciprocatory path of said bolt whereby bolt-movement to a position of retraction engages the bolt with said reciprocatory member and thereby holds said relay switch; the closing of said relay switch open temporarily also being effective to open the firing circuit.

33. In a device adapted to be applied to a machine gun for retracting the reciprocatory bolt thereof and then freeing it for counter-movement, the gun being adapted to be fired by the closing of a firing circuit including a trigger switch and a firing motor or the like, a driveable retracter unit having a member engageable with the bolt for so actuating it, an electric motor operatively connected to the unit to drive it, a motor circuit, a motor switch in said circuit, a normally open relay switch for controlling the motor switch through a relay circuit, means adapted to be put in operation by closing the trigger switch and thereby tending to close said relay switch; and a reciprocatory member connected to said relay switch and disposed in the reciprocatory path of said bolt whereby bolt-movement to a position of retraction engages the bolt with said reciprocatory member and thereby hold said relay switch open temporarily; the closing of said relay switch also being effective to open the firing circuit and to close a trigger by-pass circuit to the motor for continuing it in operation until the unit has completed the initiated cycle even though the trigger has been released in the meantime.

34. In combination with a plurality of machine guns, all of said guns being adapted to be fired by the closing of a firing circuit including a single trigger switch and a pair of firing motors or the like associated one with each gun, and each gun having a reciprocatory bolt normally adapted to be retracted by recoil forces of a fired cartridge for automatically reloading the gun-chamber; retracting mechanism applied to each gun for retracting the bolt and then freeing it for counter-movement; all of said mechanisms being initially under the control of the common trigger switch but being thereafter only and individually under the control of circuits associated individually with the guns.

35. In combination with a plurality of machine guns, all of said guns being adapted to be fired by the closing of a firing circuit including a single trigger switch and a pair of firing motors or the like associated one with each gun, and each gun having a reciprocatory bolt normally adapted to be retracted by recoil forces of a fired cartridge for automatically reloading the gun-chamber; retracting mechanism applied to each gun for retracting the bolt and then freeing it for counter-movement; all of said mechanisms being initially under the control of the common trigger switch but being thereafter only and individually under the control of circuits associated individually with the guns, each of the individual circuits including means for continuing operation of its associated retracting mechanism until it has completed any initiated cycle independently of the condition of the trigger switch, and means preventing the continuing means from affecting the condition of the other individual circuits.

36. In a device adapted to be applied to a trigger-controlled machine gun for retracting the reciprocatory bolt thereof and then freeing it for counter-movement, a driveable retractor unit having a member engageable with the bolt for so actuating it, an electric motor operatively connected to the unit to drive it, a motor circuit, an initial feed switch and a motor switch in said circuit, a relay switch for controlling the motor switch through a normally open relay circuit, means adapted to be put into operation by depressing the gun-trigger and thereby tending to close said relay switch; and a reciprocatory member connected to said relay switch and disposed in the reciprocatory path of said bolt whereby bolt-movement to a position of retraction engages the bolt with said reciprocatory member and thereby holds said relay switch open temporarily; the closing of said relay switch also being effective to close a trigger by-pass circuit to the motor and subsequently to open the initial feed-switch whereby the motor is continued in operation until the unit has completed the initiated cycle even though the trigger has been released in the meantime.

37. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, an initial feed switch and a motor switch in said circuit, a relay switch for controlling the motor switch through a normally open relay circuit, means adapted to be put into operation by depressing the gun-trigger and thereby tending to close said relay switch; and a reciprocatory member connected to said relay switch and disposed in the reciprocatory path of said bolt whereby bolt-movement to a position of retraction engages the bolt with said reciprocatory member and thereby holds said relay switch open temporarily; the closing of said relay switch also being effective to close a trigger by-pass circuit to the motor and subsequently to open the initial feed-switch whereby the motor is continued in operation until the unit has completed the initiated cycle even though the trigger has been released in the meantime; the reclosing of the initial feed switch being delayed until after the reopening of the by-pass circuit.

38. In a device adapted to be applied to a machine gun for retracting the reciprocatory bolt thereof and then freeing it for counter-movement, a driveable retracter unit having a member engageable with the bolt for so actuating it, the gun being adapted to be fired by the closing of a firing circuit including a trigger switch and a firing motor or the like; an electric motor operatively connected to the unit to drive it, a motor circuit, a normally open switch in said circuit, means tending to close said normally open switch, said means embodying a reciprocatory plunger connected to said normally open switch, an electro-magnet adapted, upon energization, to move the plunger in a direction to close the normally open switch, a normally open magnet-energizing circuit, said energizing circuit being closed by virtue of the closing of the trigger switch; said plunger being disposed in the reciprocatory path of the bolt whereby bolt movement to a position of retraction engages the bolt with the plunger and moves it in the opposite direction.

39. In a device adapted to be applied to a trigger-controlled machine gun for retracting the reciprocatory bolt thereof and then freeing it for counter-movement, a driveable retracter unit having a member engageable with the bolt for so actuating it, an electric motor operatively connected to the unit to drive it, a motor circuit, a switch in said circuit, means for actuating said switch, said means embodying a reciprocatory plunger connected to the switch, a reciprocatory telescopic joint in said plunger, and means normally and yieldingly holding the joint extended, said plunger being disposed in the reciprocatory path of the bolt in a manner whereby bolt-movement to a position of retraction engages the bolt with said plunger to telescope said joint and thereafter actuate the switch.

40. In combination with a pair of recoil-loaded machine guns, a pair of charger systems, one for each of the guns, each system including an electrically controlled retracter unit engageable with the bolt of the associated gun; a pair of electrically operated gun-firing means, one for each gun, a pair of firing circuits, one for each firing means, a pair of charger circuits, one for each retracter unit, a pair of normally closed feed switches, one in each charger circuit, a selector switch adapted to interconnect the two charger circuits and to interconnect the two firing circuits, a trigger switch for controlling the two firing circuits and partially controlling the two charger circuits when they are so interconnected, a pair of trigger by-pass switches, one in each charger circuit, whereby the charger circuits may be taken from the partial control of the trigger switch; a pair of normally open retracter switches, one in each charger circuit, a pair of electrically operated switch-actuating mechanisms, one for each charger and adapted to actuate the associated feed, by-pass and retracter switches, a pair of normally open control switches electrically connected, one each, to the actuating mechanisms for selectively operating them; said control switches being adapted to be individually closed by virtue of failure of the associated gun to fire; and a given actuating mechanism acting, upon the closing of its control switch, to close the associated by-pass and retracter switches and to open the associated feed switch.

41. In combination with a pair of recoil-loaded machine guns, a pair of charger systems, one for each of the guns, each system including an electrically controlled retracter unit engageable with the bolt of the associated gun; a pair of electrically operated gun-firing means, one for each gun, a pair of firing circuits, one for each firing means, a pair of charger circuits, one for each retracter unit, a pair of normally closed feed switches, one in each charger circuit, a selector switch adapted to interconnect the two charger circuits and to interconnect the two firing circuits, a trigger switch for controlling the two firing circuits and partially controlling the two charger circuits when they are so interconnected, a pair of trigger by-pass switches, one in each charger circuit, whereby the charger circuits may be taken from the partial control of the trigger switch; a pair of normally open retracter switches, one in each charger circuit, a pair of electrically operated switch-actuating mechanisms, one for each charger and adapted to actuate the associated feed, by-pass and retracter switches, a pair of normally open control switches electrically connected, one each, to the actuating mechanisms for selectively operating them; said control switches being adapted to be individually closed by virtue of failure of the associated gun to fire; and a given actuating mechanism acting, upon the closing of its control switch, to close the associated by-pass switch and instantly thereafter to open the associated feed switch.

42. In combination with a pair of recoil-loaded machine guns, a pair of charger systems, one for each of the guns, each system including an electrically controlled retracter unit engageable with the bolt of the associated gun; a pair of electrically operated gun-firing means, one for each gun, a pair of firing circuits, one for each firing means, a pair of charger circuits, one for each retracter unit, a pair of normally closed feed switches, one in each charger circuit, a selector switch adapted to interconnect the two charger circuits and to interconnect the two firing circuits, a trigger switch for controlling the two firing circuits and partially controlling the two charger circuits when they are so interconnected, a pair of trigger by-pass switches, one in each charger circuit, whereby the charger circuits may be taken from the partial control of the trigger switch; a pair of normally open retracter switches, one in each charger circuit, a pair of electrically operated switch-actuating mechanisms, one for each charger and adapted to actuate the associated feed, by-pass and retracter switches, a pair of normally open control switches electrically connected, one each, to the actuating mechanisms for selectively operating them; said control switches being adapted to be individually closed by virtue of failure of the associated gun to fire; and a given actuating mechanism acting, upon the closing of its control switch, to close the associated by-pass and retracter switches and to open the associated feed switch; said given actuating mechanism subsequently acting, upon the re-opening of the associated control switch, to re-open the retracter and by-pass switches, and to re-close the associated feed switch after the by-pass switch is re-opened.

43. In combination with a pair of recoil-loaded machine guns, a pair of charger systems, one for each of the guns, each system including an electrically controlled retracter unit engageable with the bolt of the associated gun; a pair of electrically operated gun-firing means, one for each gun, a pair of firing circuits, one for each firing means, a pair of charger circuits, one for each retracter unit, a pair of normally closed feed switches, one in each charger circuit, a selector switch adapted to interconnect the two charger circuits and to interconnect the two firing circuits, a trigger switch for controlling the two firing circuits and partially controlling the two charger circuits when they are so interconnected, a pair of trigger by-pass switches, one in each charger circuit, whereby the charger circuits may be taken from the partial control of the trigger switch; a pair of normally open retracter switches, one in each charger circuit, a pair of electrically operated switch-actuating mechanisms, one for each charger and adapted to actuate the associated feed, by-pass and retracter switches, a pair of normally open control switches electrically connected, one each, to the actuating mechanisms for selectively operating them; said control switches being adapted to be individually closed by virtue of failure of the associated gun to fire; and a given actuating mechanism acting, upon the closing of its control switch, to close the associated by-pass and instantly thereafter to open the associated feed switch, said given actuating mechanism acting, upon the reopening of the associated control switch, to reopen the associated by-pass switch and thereafter to reclose the associated feed switch.

PAUL G. WAGNER.

CERTIFICATE OF CORRECTION.

Patent No. 2,180,751.     November 21, 1939.
PAUL G. WAGNER.

It is hereby certified that error appears in the printed specification of the above numbered patent requiring correction as follows: Page 18, second column, line 44, claim 1, for "numer" read number; page 22, first column, lines 14 and 15, claim 31, strike out the words "normally open" and insert the same before "relay" in line 13, same claim; line 44, claim 32, for "o" before "said " read to; line 49, strike out "open temporarily" and insert the same after "switch" and before the semicolon in line 48, same claim 32, and second column, line 48, claim 36, strike out "normally open" and insert the same before "relay" in line 47, same claim; line 73, claim 37, strike out "normally open" and insert the same before "relay" in line 72, same claim; page 23, first column, line 47, claim 39, for "reciprocatory" read longitudinally; page 24, second column, line 15, claim 43, after "by-pass" insert switch; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.

CERTIFICATE OF CORRECTION.

Patent No. 2,180,751. November 21, 1939.
PAUL G. WAGNER.

It is hereby certified that error appears in the printed specification of the above numbered patent requiring correction as follows: Page 18, second column, line 44, claim 1, for "numer" read number; page 22, first column, lines 14 and 15, claim 31, strike out the words "normally open" and insert the same before "relay" in line 13, same claim; line 44, claim 32, for "o" before "said " read to; line 49, strike out "open temporarily" and insert the same after "switch" and before the semicolon in line 48, same claim 32, and second column, line 48, claim 36, strike out "normally open" and insert the same before "relay" in line 47, same claim; line 73, claim 37, strike out "normally open" and insert the same before "relay" in line 72, same claim; page 23, first column, line 47, claim 39, for "reciprocatory" read longitudinally; page 24, second column, line 15, claim 43, after "by-pass" insert switch; and that the said Letters Patent should be read with this correction therein that the same may conform to the record of the case in the Patent Office.

Signed and sealed this 6th day of February, A. D. 1940.

(Seal)
Henry Van Arsdale,
Acting Commissioner of Patents.